US009126675B2

(12) United States Patent
Chubb et al.

(10) Patent No.: US 9,126,675 B2
(45) Date of Patent: *Sep. 8, 2015

(54) METHODS AND SYSTEMS FOR TRANSITIONING AN AERIAL VEHICLE BETWEEN CROSSWIND FLIGHT AND HOVER FLIGHT

(71) Applicant: Google Inc., Mountain View, CA (US)

(72) Inventors: Erik Christopher Chubb, San Francisco, CA (US); Damon Vander Lind, Alameda, CA (US)

(73) Assignee: Google Inc., Mountain View, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/144,545

(22) Filed: Dec. 30, 2013

(65) Prior Publication Data

US 2015/0076289 A1 Mar. 19, 2015

Related U.S. Application Data

(63) Continuation-in-part of application No. 14/028,251, filed on Sep. 16, 2013.

(51) Int. Cl.
*B64C 39/02* (2006.01)
*F03D 5/00* (2006.01)
(Continued)

(52) U.S. Cl.
CPC .............. *B64C 13/00* (2013.01); *B64C 39/022* (2013.01); *F03D 5/00* (2013.01); *G05D 1/101* (2013.01); *B64C 2201/021* (2013.01); *B64C 2201/148* (2013.01); *F05B 2240/921* (2013.01)

(58) Field of Classification Search
CPC .... B64C 31/06; B64C 39/022; B64C 39/024; B64C 2201/024; B64C 2201/08; B64C 2201/148; B64F 1/04; B64F 1/12; B64F 1/125; F03D 5/00; F03D 9/002; A63H 27/04
See application file for complete search history.

(56) References Cited

U.S. PATENT DOCUMENTS 2,453,857 A * 11/1948 Platt et al. .................. 244/17.17
2,528,268 A * 10/1950 Dickinson ..................... 446/30
(Continued)

FOREIGN PATENT DOCUMENTS

WO WO2010/135604 11/2010
WO WO2011/119876 9/2011
(Continued)

OTHER PUBLICATIONS

International Search Report and Written Opinion prepared by the Korean Patent Office in International Patent Application Serial No. PCT/US2014/055714 mailed Dec. 23, 2014.
(Continued)

*Primary Examiner* — Joseph W Sanderson
(74) *Attorney, Agent, or Firm* — McDonnell Boehnen Hulbert & Berghoff LLP

(57) ABSTRACT

A method involves operating an aerial vehicle in a hover-flight orientation. The aerial vehicle is connected to a tether that defines a tether sphere having a radius based on a length of the tether, and the tether is connected to a ground station. The method involves positioning the aerial vehicle at a first location that is substantially on the tether sphere. The method involves transitioning the aerial vehicle from the hover-flight orientation to a forward-flight orientation, such that the aerial vehicle moves from the tether sphere. And the method involves operating the aerial vehicle in the forward-flight orientation to ascend at an angle of ascent to a second location that is substantially on the tether sphere. The first and second locations are substantially downwind of the ground station.

19 Claims, 16 Drawing Sheets

(51) Int. Cl.
    *B64C 13/00* (2006.01)
    *G05D 1/10* (2006.01)

(56) References Cited

U.S. PATENT DOCUMENTS

| | | | | |
|---|---|---|---|---|
| 3,383,791 | A * | 5/1968 | De Vos | 446/32 |
| 3,987,987 | A * | 10/1976 | Payne et al. | 244/153 R |
| 4,161,843 | A * | 7/1979 | Hui | 446/37 |
| 4,251,040 | A * | 2/1981 | Loyd | 244/154 |
| 4,377,051 | A * | 3/1983 | Dulake | 446/31 |
| 4,981,456 | A * | 1/1991 | Sato et al. | 446/36 |
| 6,254,034 | B1 | 7/2001 | Carpenter | |
| 6,523,781 | B2 | 2/2003 | Ragner | |
| 6,572,482 | B1 * | 6/2003 | Lewis, Jr. | 472/9 |
| 7,188,808 | B1 | 3/2007 | Olson | |
| 7,317,261 | B2 | 1/2008 | Rolt | |
| 8,028,952 | B2 * | 10/2011 | Urnes, Sr. | 244/63 |
| 8,350,403 | B2 | 1/2013 | Carroll | |
| 8,800,931 | B2 * | 8/2014 | Vander Lind | 244/154 |
| 8,888,049 | B2 * | 11/2014 | Vander Lind | 244/153 R |
| 8,922,046 | B2 * | 12/2014 | Vander Lind | 290/55 |
| 2002/0109045 | A1 | 8/2002 | Beach et al. | |
| 2007/0176432 | A1 * | 8/2007 | Rolt | 290/55 |
| 2008/0087762 | A1 | 4/2008 | Holloman et al. | |
| 2009/0185904 | A1 * | 7/2009 | Landberg | 416/131 |
| 2010/0013236 | A1 * | 1/2010 | Carroll | 290/55 |
| 2010/0026007 | A1 | 2/2010 | Bevirt | |
| 2010/0032947 | A1 | 2/2010 | Bevirt | |
| 2010/0032948 | A1 | 2/2010 | Bevirt | |
| 2010/0221112 | A1 | 9/2010 | Bevirt et al. | |
| 2010/0230546 | A1 | 9/2010 | Bevirt et al. | |
| 2010/0283253 | A1 | 11/2010 | Bevirt | |
| 2010/0295303 | A1 * | 11/2010 | Lind et al. | 290/44 |
| 2010/0295320 | A1 | 11/2010 | Bevirt | |
| 2010/0295321 | A1 | 11/2010 | Bevirt | |
| 2011/0042508 | A1 | 2/2011 | Bevirt et al. | |
| 2011/0042509 | A1 | 2/2011 | Bevirt et al. | |
| 2011/0042510 | A1 | 2/2011 | Bevirt et al. | |
| 2011/0121570 | A1 | 5/2011 | Bevirt et al. | |
| 2011/0127775 | A1 | 6/2011 | Bevirt | |
| 2011/0233325 | A1 | 9/2011 | Kramer | |
| 2011/0260462 | A1 | 10/2011 | Vander Lind | |
| 2011/0266395 | A1 | 11/2011 | Bevirt | |
| 2012/0104763 | A1 * | 5/2012 | Lind | 290/55 |
| 2012/0287274 | A1 | 11/2012 | Bevirt | |
| 2013/0084766 | A1 * | 4/2013 | Perdomo | 446/57 |
| 2013/0130586 | A1 * | 5/2013 | Orestes | 446/33 |
| 2013/0134261 | A1 | 5/2013 | Goldstein | |
| 2013/0140827 | A1 * | 6/2013 | Carroll | 290/55 |
| 2013/0221154 | A1 * | 8/2013 | Vander Lind et al. | 244/54 |
| 2013/0221679 | A1 | 8/2013 | Vander Lind | |
| 2014/0361122 | A1 * | 12/2014 | Ruiterkamp | 244/154 |

FOREIGN PATENT DOCUMENTS

| | | |
|---|---|---|
| WO | WO 2012/016319 | 2/2012 |
| WO | WO2013/049732 | 4/2013 |

OTHER PUBLICATIONS

International Search Report and Written Opinion prepared by the Korean Patent Office in International Patent Application Serial No. PCT/US2014/055697 mailed Jan. 12, 2015.
"Autonomous Airborne Wind Power" Recorded Web Video [online], Makani, YouTube, May 13, 2013. [Retrieved on Apr. 9, 2015] from Internet: https://www.youtube.com/watch?v=hbPXXpaW5ws&list=UU-iMZJ8NppwT2fLwzFWJKOQ.
"Autonomous Airborne Wind Flight May 9, 2013" Recorded Web Video [online], Makani, YouTube, May 13, 2013. [Retrieved on Apr. 9, 2015] from Internet: https://www.youtube.com/watch?v=jYN0yrntB2M&list=UU-iMZJ8NppwT2fLwzFWJKOQ.
"Makani Power, 2012 Testing Program" Recorded Web Video [online], Makani, YouTube, Nov. 14, 2012. [Retrieved on Apr. 9, 2015] from Internet: https://www.youtube.com/watch?v=Guie8JY2FTs&list=UU-iMZJ8NppwT2fLwzFWJKOQ.
"Airborne Wind Turbine Flight Demonstrations." Recorded Web Video [online], Makani, YouTube, May 4, 2012. [Retrieved on Apr. 9, 2015] from Internet: https://www.youtube.com/watch?v=ww_Y10sVboU&list=UU-iMZJ8NppwT2fLwzFWJKOQ.
"All Flight Modes of Makani AWT" Recorded Web Video [online], Makani, YouTube, Feb. 28, 2012. [Retrieved on Apr. 9, 2015] from Internet: https://www.youtube.com/watch?v=9icw1oocUto&list=UU-iMZJ8NppwT2fLwzFWJKOQ.
"Autonomous Transition to Hover" Recorded Web Video [online], Makani, YouTube, Dec. 20, 2011. [Retrieved on Apr. 9, 2015] from Internet: https://www.youtube.com/watch?v=EU4ayk6QRyE&list=UU-iMZJ8NppwT2fLwzFWJKOQ.
"Makani Power, Autonomous Power Generation, Jul. 8, 2011" Recorded Web Video [online], Makani, YouTube, Aug. 30, 2011. [Retrieved on Apr. 9, 2015] from Internet: https://www.youtube.com/watch?v=sKcp3h0VIK0&list=UU-iMZJ8NppwT2fLwzFWJKOQ.
"Makani Power, tethered hover and crosswind flight, Sep. 17, 2010" Recorded Web Video [online], Makani, YouTube, Oct. 8, 2010. [Retrieved on Apr. 9, 2015] from Internet: https://www.youtube.com/watch?v=34zeD5B0g2E&list=UU-iMZJ8NppwT2fLwzFWJKOQ.
"Makani Power Autonomous Flight. Jun. 18, 2010—HD" Recorded Web Video [online], Makani, YouTube, Jul. 19, 2010. [Retrieved on Apr. 9, 2015] from Internet:https://www.youtube.com/watch?v=IH-GpeXC5Jk&list=UU-iMZJ8NppwT2fLwzFWJKOQ.
"Autonomous flight of wing 3 (glider). Aug. 24, 2009" Recorded Web Video [online], Makani, YouTube, Jul. 16, 2010. [Retrieved on Apr. 9, 2015] from Internet https://www.youtube.com/watch?v=ziefzZ5Mel4&list=UU-iMZJ8NppwT2fLwzFWJKOQ.
Lass, Stan, Tethered Planes for Lifting and Power Generation, http://showcase.netins.net/web/stanlass/tether.html, retrieved Aug. 16, 2013.
Frank, Adrian, et al., Hover, Transition, and Level Flight Control Design for a Single-Propeller Indoor Airplane, American Institute of Aeronautics and Astronautics, pp. 1-18, http://acl.mit.edu/papers/GNC_airplane_Aug_2007_v0.pdf, May 15, 2007.

* cited by examiner

METHODS AND SYSTEMS FOR TRANSITIONING AN AERIAL VEHICLE BETWEEN CROSSWIND FLIGHT AND HOVER FLIGHT

CROSS-REFERENCE TO RELATED APPLICATION

The present application is a continuation-in-part of U.S. patent application Ser. No. 14/028,251, filed Sep. 16, 2013. The entire disclosure contents of this application are herewith incorporated by reference into the present application.

BACKGROUND

Power generation systems may convert chemical and/or mechanical energy (e.g., kinetic energy) to electrical energy for various applications, such as utility systems. As one example, a wind energy system may convert kinetic wind energy to electrical energy.

SUMMARY

Methods and systems for transitioning an aerial vehicle between certain flight modes that facilitate conversion of kinetic energy to electrical energy are described herein. Beneficially, embodiments described herein may reduce drag on the aerial vehicle, which may reduce thrust of the aerial vehicle for flight. Further, embodiments described herein may allow a thrust-to-weight ratio of the aerial vehicle to be reduced. Accordingly, the size of one or more components of the aerial vehicle, such as motors or propellers, may be reduced, which may allow the aerial vehicle to be optimized for power generation flight.

In one aspect, a method may involve operating an aerial vehicle in a hover-flight orientation, wherein the aerial vehicle is connected to a tether that defines a tether sphere having a radius based on a length of the tether, wherein the tether is connected to a ground station; while the aerial vehicle is in the hover-flight orientation, positioning the aerial vehicle at first location that is substantially on the tether sphere, wherein the first location is substantially downwind of the ground station; transitioning the aerial vehicle from the hover-flight orientation to a forward-flight orientation, such that the aerial vehicle moves from the tether sphere, wherein the aerial vehicle has attached flow, and wherein a tension of the tether is reduced; and operating the aerial vehicle in the forward-flight orientation to ascend at an angle of ascent to a second location that is substantially on the tether sphere, wherein the second location is substantially downwind of the ground station.

In another aspect, a system may include a tether connected to a ground station, wherein the tether defines a tether sphere having a radius based on a length of the tether; an aerial vehicle connected to the tether; and a control system configured to: operate the aerial vehicle in a hover-flight orientation; while the aerial vehicle is in the hover-flight orientation, position the aerial vehicle at a first location that is substantially on the tether sphere, wherein the first location is substantially downwind of the ground station; transition the aerial vehicle from the hover-flight orientation to a forward-flight orientation, such that the aerial vehicle moves from the tether sphere, wherein the aerial vehicle has attached flow, and wherein a tension of the tether is reduced; and operate the aerial vehicle in the forward-flight orientation to ascend at an angle of ascent to a second location that is substantially on the tether sphere, wherein the second location is substantially downwind of the ground station.

In another aspect, a method may involve operating an aerial vehicle in a crosswind-flight orientation, wherein the aerial vehicle is connected to a tether that defines a tether sphere having a radius based on a length of the tether, wherein the tether is connected to a ground station; while the aerial vehicle is in the crosswind-flight orientation, positioning the aerial vehicle at a first location that is substantially on the tether sphere, wherein the first location is substantially downwind of the ground station; transitioning the aerial vehicle from the crosswind-flight orientation to a forward-flight orientation, such that the aerial vehicle moves from the tether sphere, wherein the aerial vehicle has attached flow, and wherein a tension of the tether is reduced; and operating the aerial vehicle in the forward-flight orientation to ascend at an angle of ascent to a second location, wherein the second location is substantially downwind of the ground station.

In another aspect, a system may include means for operating an aerial vehicle in a hover-flight orientation, wherein the aerial vehicle is connected to a tether that defines a tether sphere having a radius based on a length of the tether, wherein the tether is connected to a ground station; while the aerial vehicle is in the hover-flight orientation, means for positioning the aerial vehicle at a first location that is substantially on the tether sphere, wherein the first location is substantially downwind of the ground station; means for transitioning the aerial vehicle from the hover-flight orientation to a forward-flight orientation, such that the aerial vehicle moves from the tether sphere, wherein the aerial vehicle has attached flow, and wherein a tension of the tether is reduced; and means for operating the aerial vehicle in the forward-flight orientation to ascend at an angle of ascent to a second location that is substantially on the tether sphere, wherein the second location is substantially downwind of the ground station.

In yet another aspect, a system may include means for operating an aerial vehicle in a crosswind-flight orientation, wherein the aerial vehicle is connected to a tether that defines a tether sphere having a radius based on a length of the tether, wherein the tether is connected to a ground station; while the aerial vehicle is in the crosswind-flight orientation, means for positioning the aerial vehicle at a first location that is substantially on the tether sphere, wherein the first location is substantially downwind of the ground station; means for transitioning the aerial vehicle from the crosswind-flight orientation to a forward-flight orientation, such that the aerial vehicle moves from the tether sphere, wherein the aerial vehicle has attached flow, and wherein a tension of the tether is reduced; and means for operating the aerial vehicle in the forward-flight orientation to ascend at an angle of ascent to a second location, wherein the second location is substantially downwind of the ground station.

In another aspect, a system may include a tether connected to a ground station, wherein the tether defines a tether sphere having a radius based on a length of the tether; an aerial vehicle connected to the tether; and a control system configured to: operate the aerial vehicle in a crosswind-flight orientation; while the aerial vehicle is in the crosswind-flight orientation, position the aerial vehicle at a first location that is substantially downwind of the ground station; transition the aerial vehicle from the crosswind-flight orientation to a forward-flight orientation, such that the aerial vehicle moves from the tether sphere, wherein the aerial vehicle has attached flow, and wherein a tension of the tether is reduced, and operate the aerial vehicle in the forward-flight orientation to ascend at an angle of ascent to a second location, wherein the second location is substantially downwind of the ground station.

In another aspect, a method may involve operating an aerial vehicle in a crosswind-flight orientation, wherein the aerial vehicle is connected to a tether that defines a tether sphere having a radius based on a length of the tether, wherein the tether is connected to a ground station; while the aerial vehicle is in the crosswind-flight orientation, positioning the aerial vehicle at a first location that is substantially on the tether sphere, wherein the first location is substantially downwind of the ground station; transitioning the aerial vehicle from the crosswind-flight orientation to a forward-flight orientation, such that a tension of the tether is reduced, wherein the aerial vehicle has attached flow; and operating the aerial vehicle in the forward-flight orientation to ascend at an angle of ascent to a second location, wherein the second location is substantially downwind of the ground station.

In yet another aspect, a system may include means for operating an aerial vehicle in a crosswind-flight orientation, wherein the aerial vehicle is connected to a tether that defines a tether sphere having a radius based on a length of the tether, wherein the tether is connected to a ground station; while the aerial vehicle is in the crosswind-flight orientation, means for positioning the aerial vehicle at a first location that is substantially on the tether sphere, wherein the first location is substantially downwind of the ground station; means for transitioning the aerial vehicle from the crosswind-flight orientation to a forward-flight orientation, such that a tension of the tether is reduced, wherein the aerial vehicle has attached flow; and means for operating the aerial vehicle in the forward-flight orientation to ascend at an angle of ascent to a second location, wherein the second location is substantially downwind of the ground station.

These as well as other aspects, advantages, and alternatives, will become apparent to those of ordinary skill in the art by reading the following detailed description, with reference where appropriate to the accompanying drawings.

DETAILED DESCRIPTION

Figure 1:
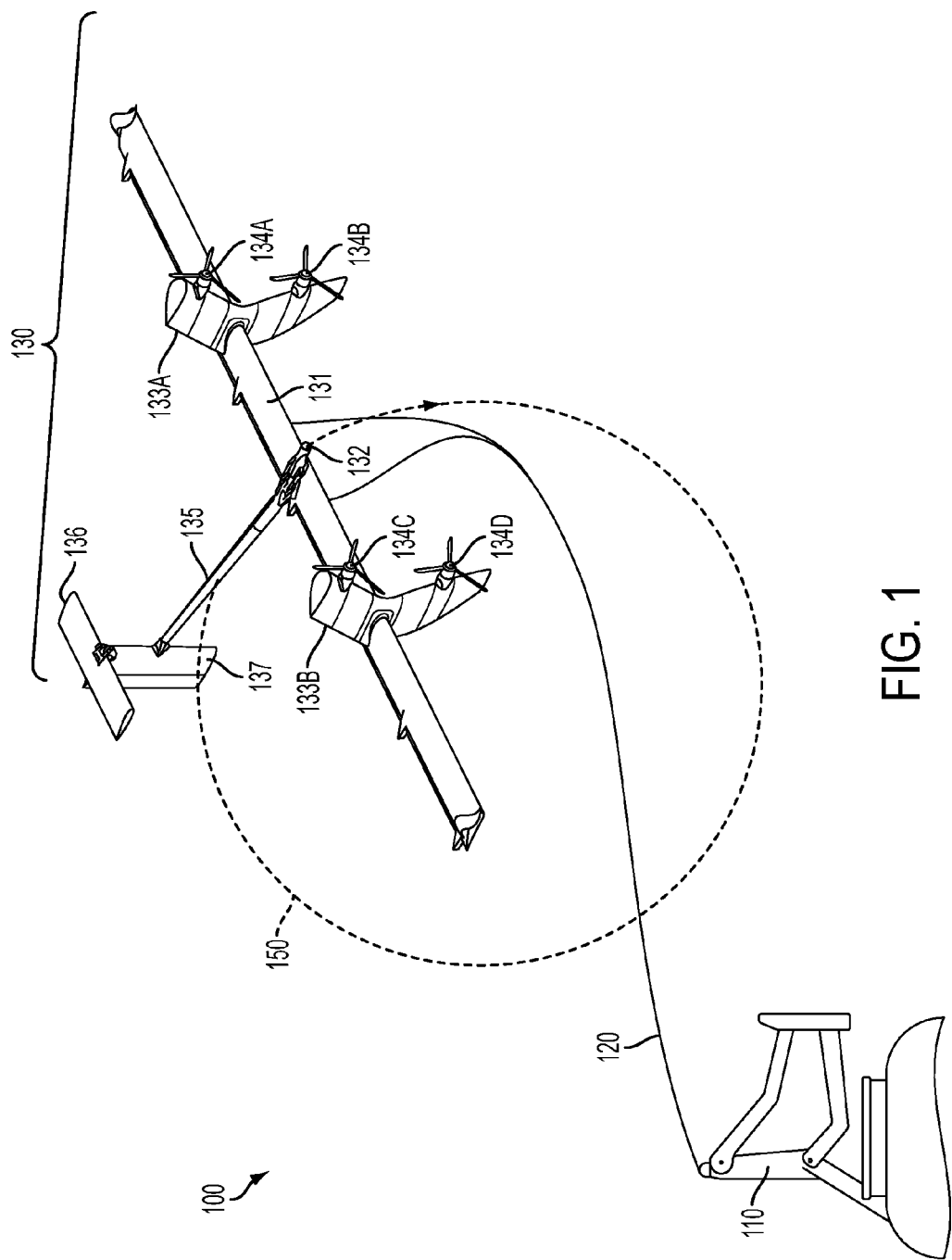
FIG. 1 depicts an Airborne Wind Turbine (AWT), according to an example embodiment.

Exemplary methods and systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed methods systems and can be arranged and combined in a wide variety of different configurations, all of which are contemplated herein.

I. OVERVIEW

Illustrative embodiments relate to aerial vehicles, which may be used in a wind energy system, such as an Airborne Wind Turbine (AWT). In particular, illustrative embodiments relate to or take the form of methods and systems for transitioning an aerial vehicle between certain flight modes that facilitate conversion of kinetic energy to electrical energy.

By way of background, an AWT may include an aerial vehicle that flies in a path, such as a substantially circular path, to convert kinetic wind energy to electrical energy. In an illustrative implementation, the aerial vehicle is connected to a ground station via a tether. While tethered, the aerial vehicle can: (i) fly at a range of elevations and substantially along the path, and return to the ground, and (ii) transmit electrical energy to the ground station via the tether. (In some implementations, the ground station transmits electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle vertically ascends or descends in hover flight.

In crosswind flight, the aerial vehicle may be propelled by the wind substantially along a path, which as noted above, may convert kinetic wind energy to electrical energy. In some implementations, the one or more propellers of the aerial vehicle generate electrical energy by slowing down the incident wind.

The aerial vehicle may enter crosswind flight when (i) the aerial vehicle has attached flow (e.g., steady flow and/or no stall condition (which may refer to no separation of air flow from an airfoil)) and (ii) the tether is under tension. Moreover, the aerial vehicle may enter crosswind flight at a location that is substantially downwind of the ground station.

In some implementations, a tension of the tether during crosswind flight is greater than a tension of the tether during hover flight. For instance, the tension of the tether during crosswind flight may be 15 kilonewtons (KN), and the tension of the tether during hover flight may be 1 KN.

Embodiments described herein relate to transitioning an aerial vehicle from hover flight to crosswind flight. In an illustrative implementation, a method involves transitioning an aerial vehicle from a hover-flight orientation to a forward-flight orientation and operating the aerial vehicle in the forward-flight orientation to ascend to a location for crosswind flight. Beneficially, embodiments described herein may reduce drag on the aerial vehicle during ascent to the location for crosswind flight, which may reduce power consumption of the aerial vehicle. Further, embodiments described herein may allow a thrust-to-weight ratio of the aerial vehicle to be reduced. Accordingly, the size of one or more components of the aerial vehicle, such as motors or propellers, may be reduced, which may allow the aerial vehicle to be optimized for power generation flight.

Moreover, other embodiments may relate to transitioning an aerial vehicle from crosswind flight to hover flight. For instance, some implementations involve transitioning an aerial vehicle from a crosswind-flight orientation to a forward-flight orientation and operating the aerial vehicle in the forward-flight orientation to move to a location for hover flight. In addition, some implementations involve transitioning an aerial vehicle from a crosswind-flight orientation to a forward-flight orientation to decelerate the aerial vehicle to a speed for hover flight. Beneficially, such implementations may improve entering hover flight by quickly reducing a speed of the aerial vehicle at a low altitude.

II. ILLUSTRATIVE SYSTEMS

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, forward flight, crosswind flight. In some implementations, a ground station 110 may be configured for use on land. However, a ground station 110 may also be implemented on a body of water, such as a lake, river, sea, or ocean. For example, a ground station 110 could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein and/or transitioning an aerial vehicle between certain flight modes as described herein.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have one or more dimensions that correspond with a conventional wind turbine blade. As another example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced between the main wing 131. In some examples, a vertical spacing between corresponding rotors (e.g., rotor 134A and rotor 134B or rotor 134C and rotor 134D) may be 0.9 meters.

The rotors 134A-D may configured to drive one or more generators for the purpose of generating electrical energy. In this example, the rotors 134A-D may each include one or more blades, such as three blades. The one or more rotor blades may rotate via interactions with the wind and which could be used to drive the one or more generators. In addition, the rotors 134A-D may also be configured to provide a thrust to the aerial vehicle 130 during flight. With this arrangement, the rotors 134A-D may function as one or more propulsion units, such as a propeller. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 2 meters. Moreover, in some examples, the tail wing 136 may have a surface area of 0.45 meters squared. Further, in some examples, the tail wing 136 may be located 1 meter above a center of mass of the aerial vehicle 130.

While the aerial vehicle 130 has been described above, it should be understood that the methods and systems described herein could involve any suitable aerial vehicle that is connected to a tether, such as the tether 120.

B. Illustrative Components of an AWT

Figure 2:
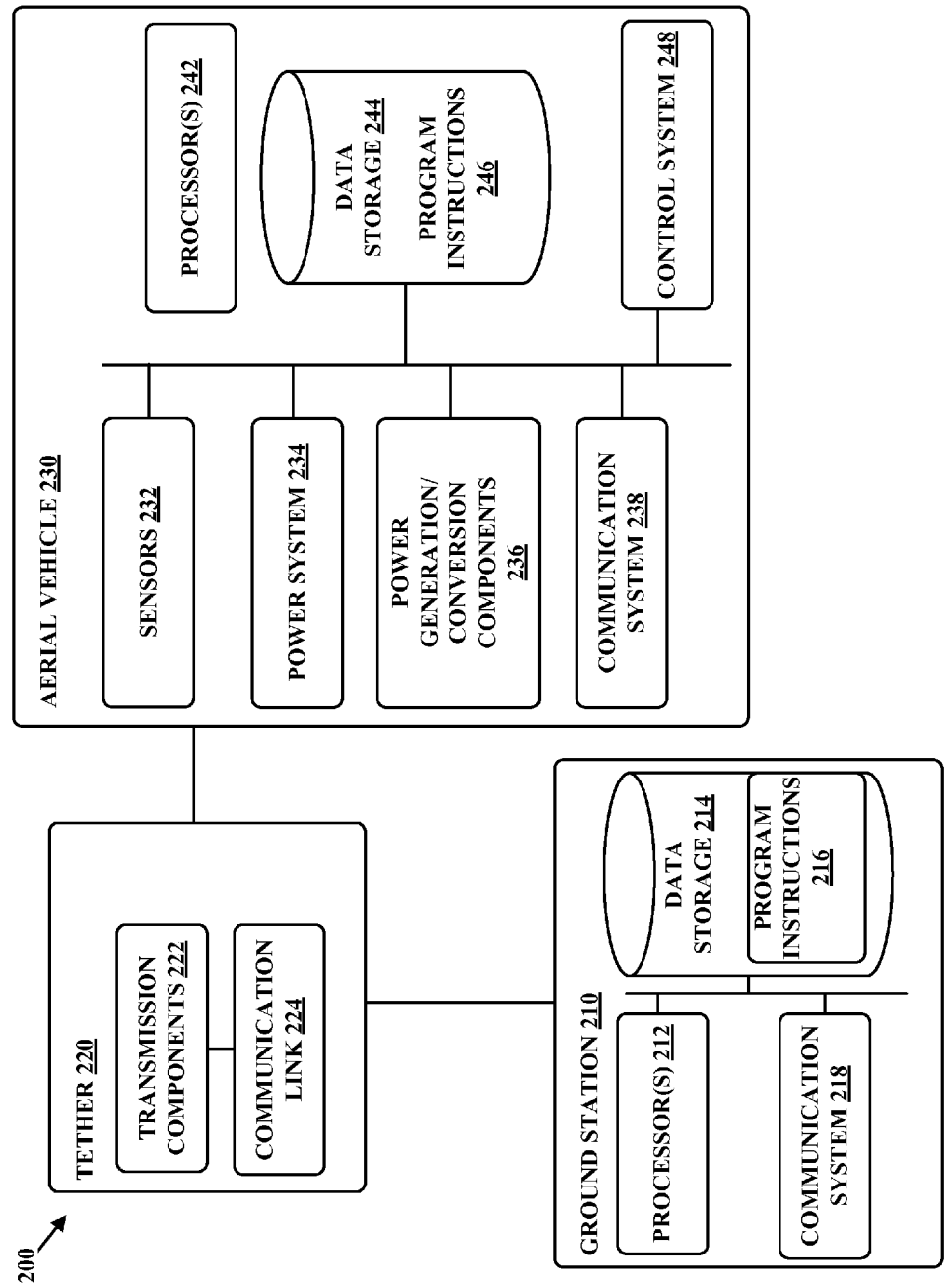
FIG. 2 is a simplified block diagram illustrating components of an AWT, according to an example embodiment.

FIG. 2 is a simplified block diagram illustrating components of the AWT 200. The AWT 200 may take the form of or be similar in form to the AWT 100. In particular, the AWT 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more generators, such as high-speed, direct-drive generators. With this arrangement, the one or more generators may be driven by one or more rotors, such as the rotors 134A-D. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 230 and/or the tether 110.

C. Transitioning an Aerial Vehicle from Hover Flight to Crosswind Flight

Figure 3A:
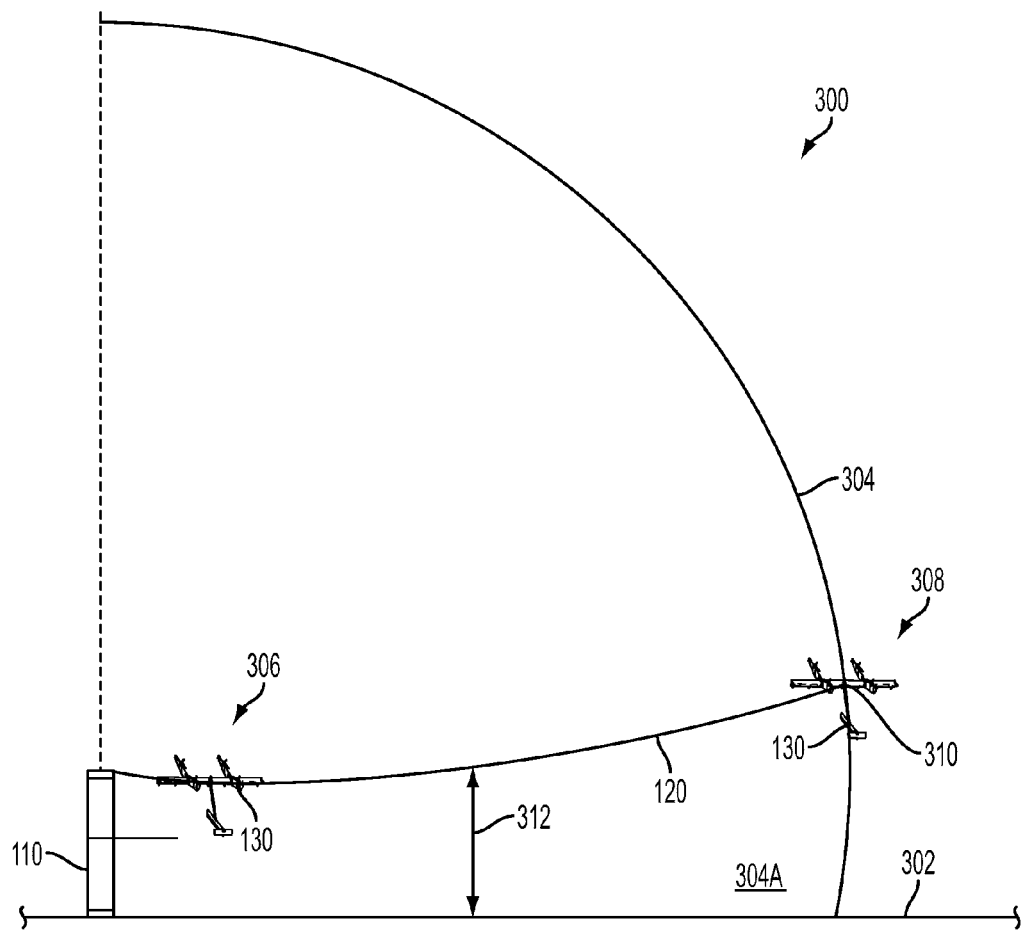
FIGS. 3a and 3b depict an example of an aerial vehicle transitioning from hover flight to crosswind flight, according to an example embodiment.
Figure 3B:
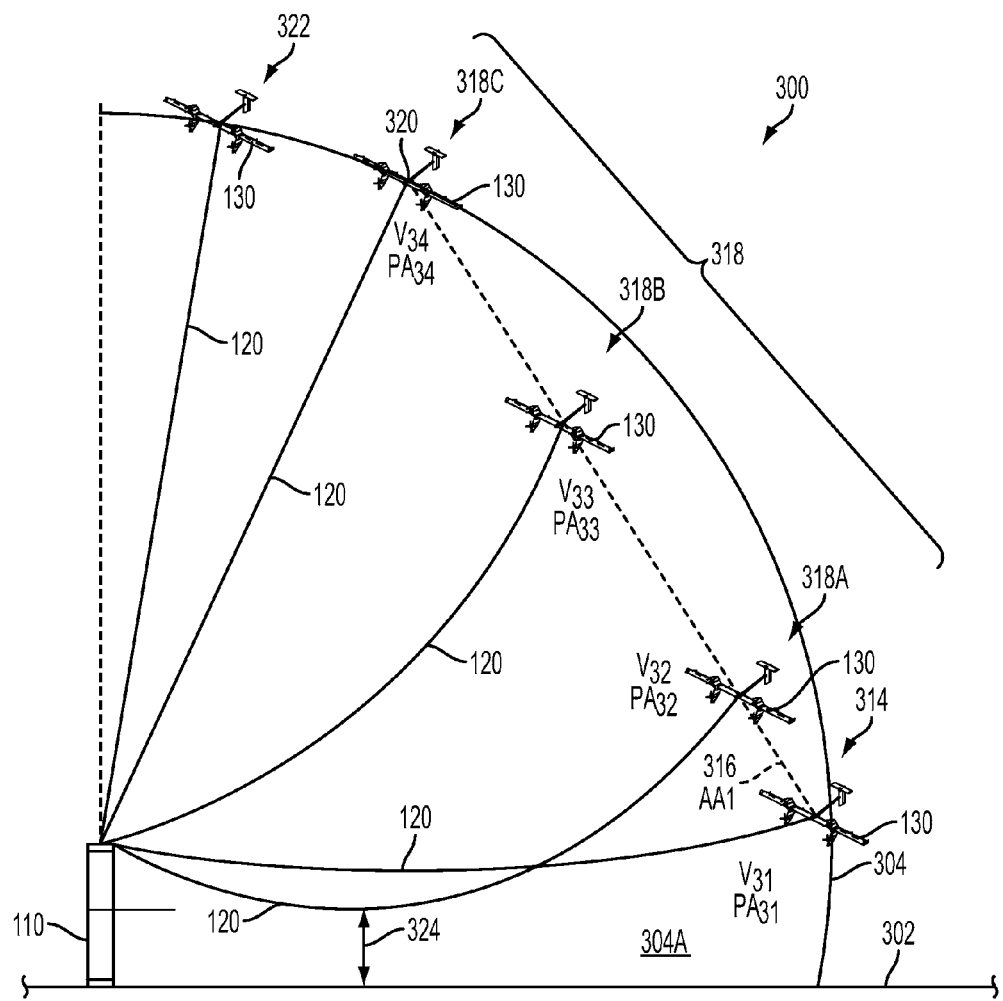

FIGS. 3a and 3b depict an example 300 of transitioning an aerial vehicle from hover flight to crosswind flight, according to an example embodiment. Example 300 is generally described by way of example as being carried out by the aerial vehicle 130 described above in connection with FIG. 1. For illustrative purposes, example 300 is described in a series of actions as shown in FIGS. 3a and 3b, though example 300 could be carried out in any number of actions and/or combination of actions.

As shown in FIG. 3a, the aerial vehicle 130 is connected to the tether 120, and the tether 120 is connected to the ground station 110. The ground station 110 is located on ground 302. Moreover, as shown in FIG. 3, the tether 120 defines a tether sphere 304 having a radius based on a length of the tether 120, such as a length of the tether 120 when it is extended. Example 300 may be carried out in and/or substantially on a portion 304A of the tether sphere 304. The term "substantially on," as used in this disclosure, refers to exactly on and/or one or more deviations from exactly on that do not significantly impact transitioning an aerial vehicle between certain flight modes as described herein.

Example 300 begins at a point 306 with deploying the aerial vehicle 130 from the ground station 110 in a hover-flight orientation. With this arrangement, the tether 120 may be paid out and/or reeled out. In some implementations, the aerial vehicle 130 may be deployed when wind speeds increase above a threshold speed (e.g., 3.5 m/s) at a threshold altitude (e.g., over 200 meters above the ground 302).

Further, at point 306 the aerial vehicle 130 may be operated in the hover-flight orientation. When the aerial vehicle 130 is in the hover-flight orientation, the aerial vehicle 130 may engage in hover flight. For instance, when the aerial vehicle engages in hover flight, the aerial vehicle 130 may ascend, descend, and/or hover over the ground 302. When the aerial vehicle 130 is in the hover-flight orientation, a span of the main wing 131 of the aerial vehicle 130 may be oriented substantially perpendicular to the ground 302. The term "substantially perpendicular," as used in this disclosure, refers to exactly perpendicular and/or one or more deviations from exactly perpendicular that do not significantly impact transitioning an aerial vehicle between certain flight modes as described herein.

Example 300 continues at a point 308 with while the aerial vehicle 130 is in the hover-flight orientation positioning the aerial vehicle 130 at a first location 310 that is substantially on the tether sphere 304. As shown in FIG. 3a, the first location 310 may be in the air and substantially downwind of the ground station 110.

The term "substantially downwind," as used in this disclosure, refers to exactly downwind and/or one or more deviations from exactly downwind that do not significantly impact transitioning an aerial vehicle between certain flight modes as described herein.

For example, the first location 310 may be at a first angle from an axis extending from the ground station 110 that is substantially parallel to the ground 302. In some implementations, the first angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 310 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis. The term "substantially parallel," as used in this disclosure refers to exactly parallel and/or one or more deviations from exactly parallel that do not significantly impact transitioning an aerial vehicle between certain flight modes described herein.

At point 308, the aerial vehicle 130 may accelerate in the hover-flight orientation. For example, at point 308, the aerial vehicle 130 may accelerate up to a few meters per second. In addition, at point 308, the tether 120 may take various different forms in various different embodiments. For example, as shown in FIG. 3a, at point 308 the tether 120 may be extended. With this arrangement, the tether 120 may be in a catenary configuration. Moreover, at point 306 and point 308, a bottom of the tether 120 may be a predetermined altitude 312 above the ground 302. With this arrangement, at point 306 and point 308 the tether 120 may not contact the ground 302.

Example 300 continues at point 314 with transitioning the aerial vehicle 130 from the hover-flight orientation to a forward-flight orientation, such that the aerial vehicle 130 moves from the tether sphere 304. As shown in FIG. 3b, the aerial vehicle 130 may move from the tether sphere 304 to a location toward the ground station 110 (which may be referred to as being inside the tether sphere 304).

When the aerial vehicle 130 is in the forward-flight orientation, the aerial vehicle 130 may engage in forward flight (which may be referred to as airplane-like flight). For instance, when the aerial vehicle 130 engages in forward flight, the aerial vehicle 130 may ascend. The forward-flight orientation of the aerial vehicle 130 could take the form of an orientation of a fixed-wing aircraft (e.g., an airplane) in horizontal flight. In some examples, transitioning the aerial vehicle 130 from the hover-flight orientation to the forward-flight orientation may involve a flight maneuver, such as pitching forward. And in such an example, the flight maneuver may be executed within a time period, such as less than one second.

At point 314, the aerial vehicle 130 may achieve attached flow. Further, at point 314, a tension of the tether 120 may be reduced. With this arrangement, a curvature of the tether 120 at point 314 may be greater than a curvature of the tether 120 at point 308. As one example, at point 314, the tension of the tether 120 may be less than 1 KN, such as 500 newtons (N).

Example 300 continues at one or more points 318 with operating the aerial vehicle 130 in the forward-flight orientation to ascend at an angle of ascent AA1 to a second location 320 that is substantially on the tether sphere 304. As shown in FIG. 3*b*, the aerial vehicle 130 may fly substantially along a path 316 during the ascent at one or more points 318. In this example, one or more points 318 is shown as three points, a point 318A, a point 318B, and a point 318C. However, in other examples, one or more points 318 may include less than three or more than three points.

In some examples, the angle of ascent AA1 may be an angle between the path 316 and the ground 302. Further, the path 316 may take various different forms in various different embodiments. For instance, the path 316 may a line segment, such as a chord of the tether sphere 304. And, in some situations, the path 316 may be a line segment that intersects each location of point 318A, point 318B, and point 318C. In addition, the path 316 may be a curve. For example, the path 316 may be a curve that has a curvature based on a speed of the aerial vehicle 130 and a tangency of the path 316 at the second location 320.

In some implementations, the aerial vehicle 130 may have attached flow during the ascent. Moreover, in such an implementation, effectiveness of one or more control surfaces of the aerial vehicle 130 may be maintained. Further, in such an implementation, example 300 may involve selecting a maximum angle of ascent, such that the aerial vehicle 130 has attached flow during the ascent. Moreover, in such an implementation, example 300 may involve adjusting a pitch angle of the aerial vehicle 130 based on the maximum angle of ascent and/or adjusting thrust of the aerial vehicle 130 based on the maximum angle of ascent. In some examples, the adjusting thrust of the aerial vehicle 130 may involve using differential thrusting of one or more of the rotors 134A-D of the aerial vehicle 130. The pitch angle may be an angle between the aerial vehicle 130 and a vertical axis that is substantially perpendicular to the ground 302.

As shown in FIG. 3*b*, at point 314 the aerial vehicle 130 may have a speed V31 and a pitch angle PA31; at point 318A the aerial vehicle 130 may have a speed V32 and a pitch angle PA32; at point 318B the aerial vehicle 130 may have a speed V33 and a pitch angle PA33; and at point 318C the aerial vehicle 130 may have a speed V34 and a pitch angle PA34.

In some implementations, the angle of ascent AA1 may be selected before point 318A. With this arrangement, the pitch angle PA31 and/or the pitch angle PA32 may be selected based on the angle of ascent AA1. Further, in some examples, the pitch angle PA32, the pitch angle PA33, and/or the pitch angle PA34 may be equal to the pitch angle PA31. However, in other examples, the pitch angles PA31, PA32, PA33, and/or PA34 may be different than each other. For instance, the pitch angle PA31 may be greater or less than pitch angles PA32, PA33, and/or PA34; the pitch angle PA32 may be greater or less than pitch angles PA33, PA34, and/or PA31; the pitch angle PA33 may be greater or less than pitch angles PA34, PA31, and/or PA32; and the pitch angle PA34 may be greater or less than pitch angles PA31, PA32, and/or PA33. Further, the pitch angle PA33 and/or PA34 may be selected and/or adjusted during the ascent. Further still, the pitch angle PA31 and/or PA32 may be adjusted during the ascent.

Moreover, in some implementations, the speed V31 and/or the speed V32 may be selected based on the angle of ascent AA1. Further, in some examples, the speed V32, the speed V33, and the speed V34 may be equal to the speed V31. However, in other examples, speeds V31, V32, V33, and V34 may be different than each other. For example, the speed V34 may be greater than the speed V33, the speed V33 may be greater than the speed V32, and the speed V32 may be greater than the speed V31. Further, speeds V31, V32, V33, and/or V34 may be selected and/or adjusted during the ascent.

In some implementations, any or all of the speeds V31, V32, V33, and/or V34 may be a speed that corresponds with a maximum (or full) throttle of the aerial vehicle 130. Further, in some implementations, at the speed V32, the aerial vehicle 130 may ascend in a forward-flight orientation. Moreover, at the speed V32, the angle of ascent AA1 may be converged.

As shown in FIG. 3*b*, the second location 320 may be in the air and substantially downwind of the ground station 110. The second location 320 may be oriented with respect to the ground station 110 the similar way as the first location 310 may be oriented with respect to the ground station 110.

For example, the second location 320 may be at a first angle from an axis extending from the ground station 110 that is substantially parallel to the ground 302. In some implementations, the first angle may be 30 degrees from the axis. In some situations, the first angle may be referred to as azimuth, and the angle may be between 30 degrees clockwise from the axis and 330 degrees clockwise from the axis, such as 15 degrees clockwise from the axis or 345 degrees clockwise from the axis.

In addition, as shown in FIG. 3*b*, the second location 320 may be substantially upwind of the first location 310. The term "substantially upwind," as used in this disclosure, refers to exactly upwind and/or one or more deviations from exactly upwind that do not significantly impact transitioning an aerial vehicle between certain flight modes as described herein.

At one or more points 318, a tension of the tether 120 may increase during the ascent. For example, a tension of the tether 120 at point 318C may be greater than a tension of the tether 120 at point 318B, a tension of the tether 120 at point 318B may be greater than a tension of the tether 120 at point 318A. Further, a tension of the tether 120 at point 318A may be greater than a tension of the tether at point 314.

With this arrangement, a curvature of the tether 120 may decrease during the ascent. For example, a curvature the tether 120 at point 318C may be less than a curvature the tether at point 318B, and a curvature of the tether 120 at point 318B may be less than a curvature of the tether at point 318A. Further, in some examples, a curvature of the tether 120 at point 318A may be less than a curvature of the tether 120 at point 314.

Moreover, in some examples, when the aerial vehicle 130 includes a GPS receiver, operating the aerial vehicle 130 in the forward-flight orientation to ascend at an angle of ascent may involve monitoring the ascent of the aerial vehicle 130 with the GPS receiver. With such an arrangement, control of a trajectory of the aerial vehicle 130 during the ascent may be improved. As a result, the aerial vehicle 130's ability to follow one or more portions and/or points of the path 316 may be improved.

Further, in some examples, when the aerial vehicle 130 includes at least one pitot tube, operating the aerial vehicle 130 in a forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle during the ascent may be improved. As a result, the aerial vehicle 130's ability to follow one or more portions and/or points of the path 316 may be improved. The angle of attack may be an angle between a body axis of the aerial vehicle 130 and an apparent wind vector. For instance, the angle of attack may be an angle between a first axis of the aerial vehicle (e.g., a longitudinal axis) and an apparent wind vector projected into a plane defined (e.g., spanned) by the first axis of the aerial vehicle and a second axis of the aerial vehicle (e.g., a vertical axis). In addition, the angle of attack may be referred to as alpha. Further, the side slip may be an angle between a direction substantially perpendicular to a heading of the aerial vehicle 130 and the apparent wind vector. For instance, side slip may be an angle between an apparent wind vector and a plane defined (e.g., spanned) by a first axis of the aerial vehicle 130 (e.g., a longitudinal axis) and a second axis of the aerial vehicle 130 (e.g., a vertical axis). In addition, the side slip may be referred to as beta.

Example 300 continues at a point 322 with transitioning the aerial vehicle 130 from the forward-flight orientation to a crosswind-flight orientation. In some examples, transitioning the aerial vehicle 130 from the forward-flight orientation to the crosswind-flight orientation may involve a flight maneuver.

When the aerial vehicle 130 is in the crosswind-flight orientation, the aerial vehicle 130 may engage in crosswind flight. For instance, when the aerial vehicle 130 engages in crosswind flight, the aerial vehicle 130 may fly substantially along a path, such as path 150, to generate electrical energy. In some implementations, a natural roll and/or yaw of the aerial vehicle 130 may occur during crosswind flight.

As shown in FIG. 3b, at points 314-322 a bottom of the tether 120 may be a predetermined altitude 324 above the ground 302. With this arrangement, at points 314-322 the tether 120 may not touch the ground 302. In some examples, the predetermined altitude 324 may be less than the predetermined altitude 312. In some implementations, the predetermined altitude 324 may be greater than one half of the height of the ground station 110. And in at least one such implementation, the predetermined altitude 324 may be 6 meters.

Thus, example 300 may be carried out so that the tether 120 may not contact the ground 302. With such an arrangement, the mechanical integrity of the tether 120 may be improved. For example, the tether 120 might not catch on (or tangle around) objects located on the ground 302. As another example, when the tether sphere 304 is located above a body of water (e.g., an ocean, a sea, a lake, a river, and the like), the tether 120 might not be submersed in the water. In addition, with such an arrangement, safety of one or more people located near the ground station 110 (e.g., within the portion 304A of the tether sphere 304) may be improved.

In addition, example 300 may be carried out so that a bottom of the tether 120 remains above the predetermined altitude 324. With such an arrangement, the mechanical integrity of the tether 120 may be improved as described herein and/or safety of one or more people located near the ground station 110 (e.g., within the portion 304A of the tether sphere 304) may be improved.

Moreover, one or more actions that correspond with points 306-322 may be performed at various different time periods in various different embodiments. For instance, the one or more actions that correspond with point 306 may be performed at a first time period, the one or more actions that correspond with point 308 may be performed at a second time period, the one or more actions that correspond with point 314 may be performed at a third time period, the one or more actions that correspond with point 318A may be performed at a fourth time period, the one or more actions that correspond with point 318B may be performed at a fifth time period, the one or more actions that correspond with point 318C may be performed at a sixth time period, and the one or more actions that correspond with point 322 may be performed at a seventh time period. However, in other examples, at least some of the actions of the one or more actions that correspond with points 306-322 may be performed concurrently.

Although at point 314 the aerial vehicle 130 has been described as moving from the tether sphere 304, in other examples at point 314 the aerial vehicle 130 may not move from the tether sphere 304. For instance, at point 314 the aerial vehicle 130 may not move from the tether sphere 304 during certain wind conditions, such as when the apparent wind has a speed between 15 to 20 m/s. Instead, at point 314 the aerial vehicle 130 may transition from the hover-flight orientation to a forward-flight orientation, such that a tension in the tether is reduced. With this arrangement, a curvature of the tether 120 at point 314 may be greater than a curvature of the tether 120 at point 308.

In some such examples, transitioning the aerial vehicle 130 from the crosswind-flight orientation to the forward-flight orientation may involve a flight maneuver, such as pitching forward. Further, in some such examples, the flight maneuver may be executed within a time period, such as less than one second.

Moreover, in some such examples, at point 314 when the aerial vehicle 130 transitions from the hover-flight orientation to a forward-flight orientation, such that a tension in the tether is reduced, at one or more points 318 the aerial vehicle may fly substantially along a path that may be substantially on a portion of the tether sphere 304, such as a portion of the tether sphere 304 between the first location 310 and the second location 320. With this arrangement, at one or more points 318 a tension of the tether 120 may increase during the ascent and a curvature of the tether 120 may decrease during the ascent. And in some such examples, example 300 may continue at point 322 with transitioning the aerial vehicle 130 from the forward-flight orientation to a crosswind-flight orientation.

However, in other such examples, example 300 may continue at one or more points 318, with operating the aerial vehicle 130 in the forward-flight orientation to ascend at an angle of ascent to the second location 320 as described above, and may continue at point 322 with transitioning the aerial vehicle 130 from the forward-flight orientation to a crosswind-flight orientation as described above. With this arrangement, at point 314 when the aerial vehicle 130 transitions from the hover-flight orientation to a forward-flight orientation, such that a tension in the tether is reduced, at one or more points 318 the aerial vehicle 130 may fly substantially along the path 316 during the ascent.

Further, although example 300 has described with the ground station 110 located on the ground 302, in other examples the ground station 110 may be mobile. For instance, the ground station 110 may be configured to move relative to the ground 302 or a surface of a body of water.

Figure 4A:
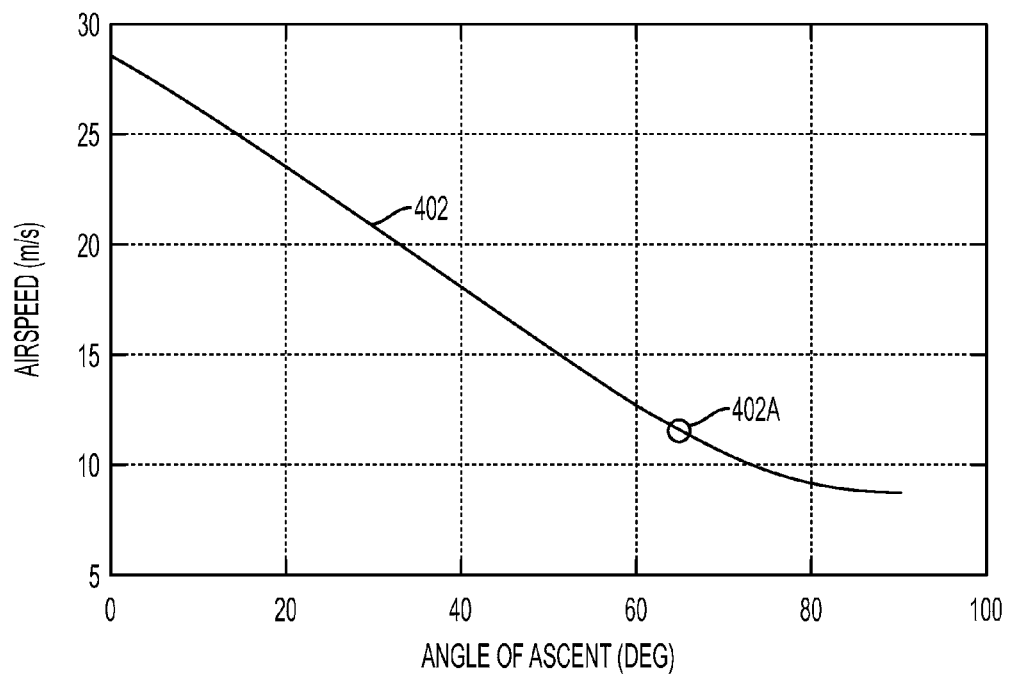
FIGS. 4a-c are graphical representations involving an angle of ascent, according to an example embodiment.
Figure 4B:
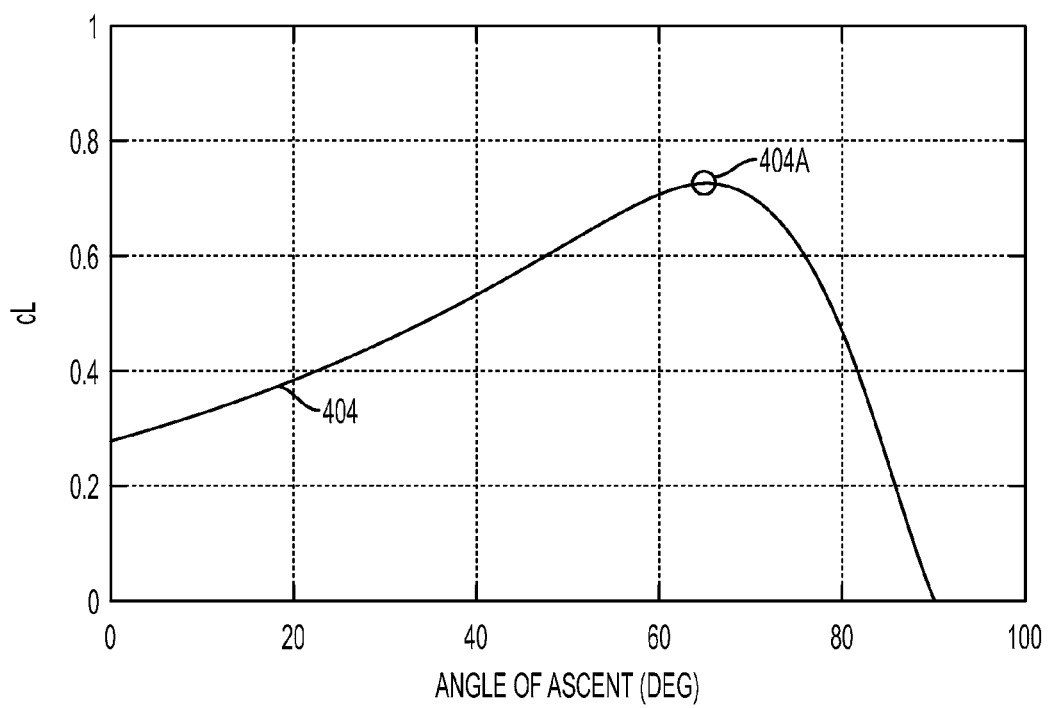
Figure 4C:
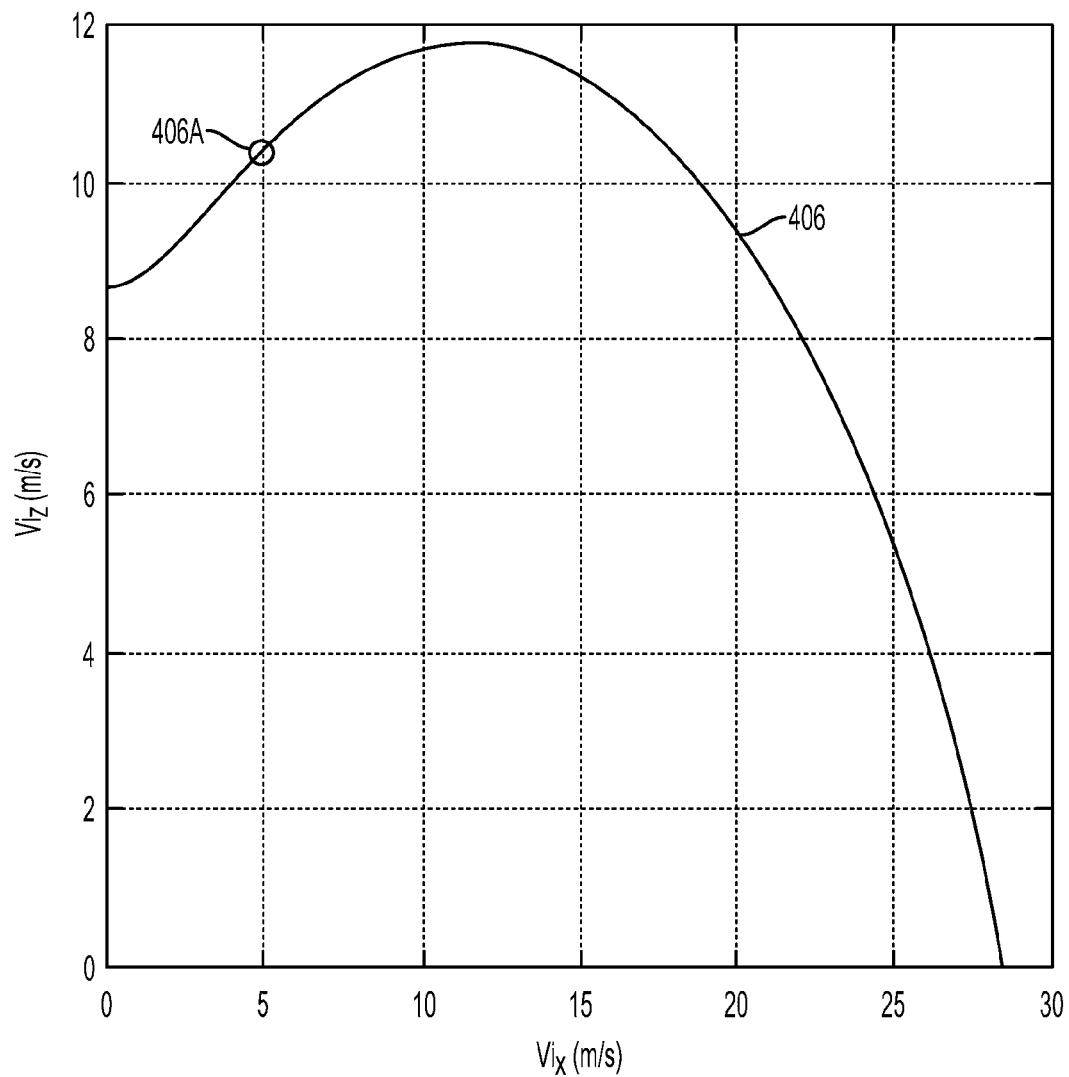

FIGS. 4a-c are graphical representations involving an angle of ascent, according to an example embodiment. In particular, FIG. 4a is a graphical representation 402, FIG. 4b is a graphical representation 404, and FIG. 4c is a graphical representation 406. Each of graphical representations 402, 404, and 406 may be based on example 300.

More specifically, in FIGS. 4a-c, an aerial vehicle in an example of transitioning the aerial vehicle from hover flight to crosswind flight may have a thrust-to-weight ratio (T/W) of 1.3 and a coefficient of drag ($C_D$) equal to the equation $3+(C_L^2/eAR\pi)$, where $C_L$ is coefficient of lift, e is span efficiency of the aerial vehicle, and AR is aspect ratio of the aerial vehicle. However, in other examples, aerial vehicles described herein may have various other thrust-to-weight ratios, such as a thrust-to-weight ratio greater than 1.2. Further, in other examples, aerial vehicles described herein may have various other values of $C_D$, such as a value of $C_D$ between 0.1 and 0.2.

As noted, FIG. 4a is the graphical representation 402. In particular, the graphical representation 402 depicts an angle of ascent of an aerial vehicle in relation to air speed. In graphical representation 402, the angle of ascent may be measured in degrees, and the airspeed may be measured in m/s. As shown in FIG. 4a, a point 402A on the graphical representation 402 may represent a maximum angle of ascent of an aerial vehicle for attached flow during an ascent, such as at one or more points 318 in example 300. In graphical representation 402, the maximum angle of ascent may be about 65 degrees, and an airspeed that corresponds with the maximum angle of ascent may be about 11 m/s.

Moreover, as noted, FIG. 4b is the graphical representation 404. In particular, the graphical representation 404 depicts an angle of ascent of an aerial vehicle in relation to $C_L$ of the aerial vehicle. In graphical representation 404, the angle of ascent may be measured in degrees, and $C_L$ may be a value without a unit of measurement. As shown in FIG. 4b, a point 404A on the graphical representation 404 may represent a maximum angle of ascent of an aerial vehicle for attached flow during an ascent, such as at one or more points 318 in example 300. In graphical representation 404, the maximum angle of ascent may be about 65 degrees, and the $C_L$ that corresponds with the maximum angle of ascent may be about 0.7.

Further, as noted, FIG. 4c is the graphical representation 406. In particular, the graphical representation 406 depicts a first component of a speed of an aerial vehicle in relation to a second component of the speed of the aerial vehicle. In graphical representation 406, the first and second components of speed of the aerial vehicle may be measured in m/s. In some examples, the first component of the speed of the aerial vehicle may be in a direction that is substantially parallel with the ground. Further, in some examples, the second component of the speed of the aerial vehicle may be in a direction that is substantially perpendicular with the ground.

As shown in FIG. 4c, a point 406A on the graphical representation 406 may represent a first and second component of a speed of the aerial vehicle when the aerial vehicle is at a maximum angle of ascent for attached flow during an ascent, such as at one or more points 318 in example 300. In graphical representation 406, the first component of the speed of the aerial vehicle that corresponds with the maximum angle of ascent may about 5 m/s, and the second component of the speed of the aerial vehicle that corresponds with the maximum angle of ascent may be about 10.25 m/s.

Figure 5A:
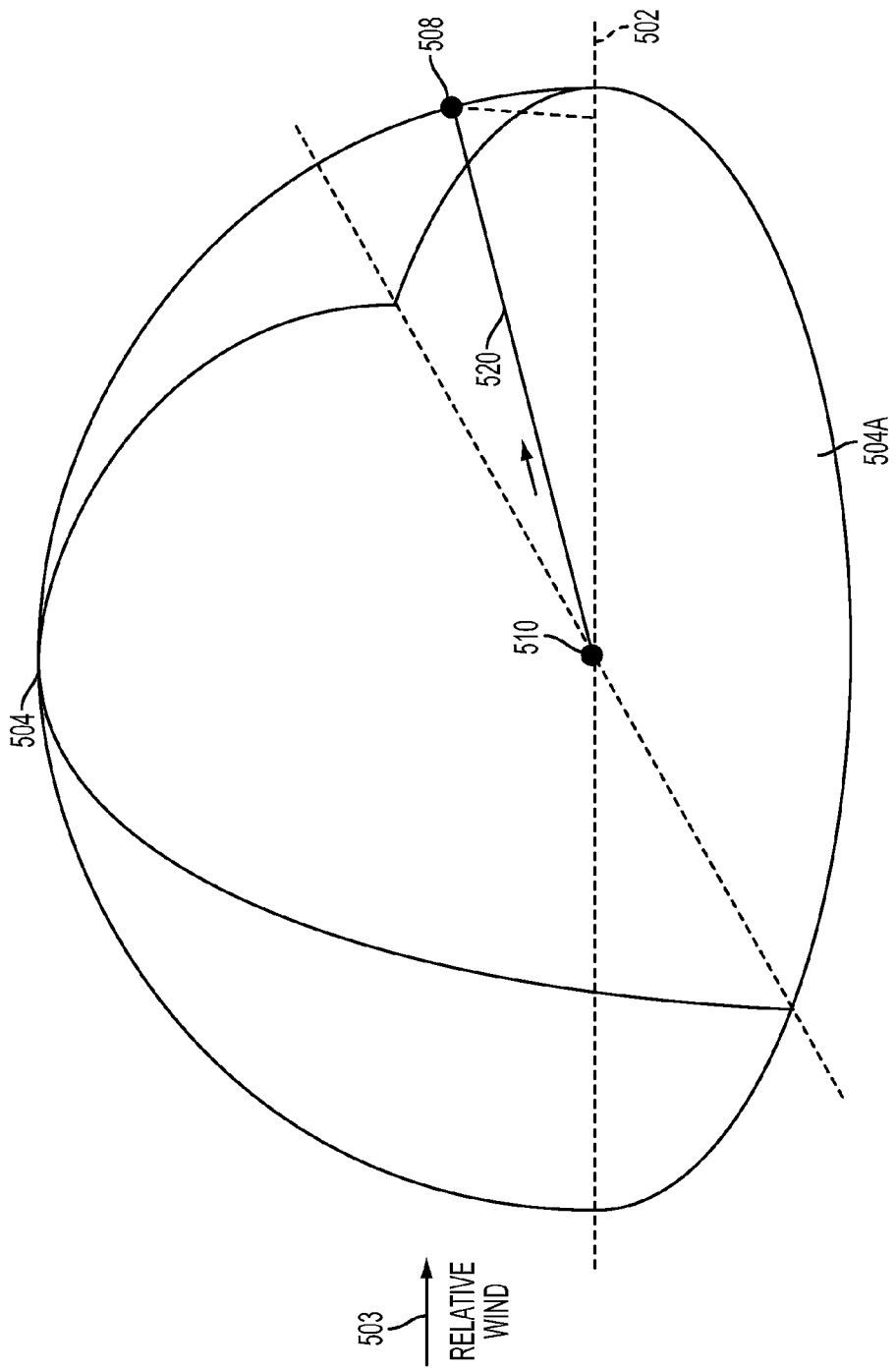
FIGS. 5a and 5b depict a tether sphere, according to an example embodiment.
Figure 5B:
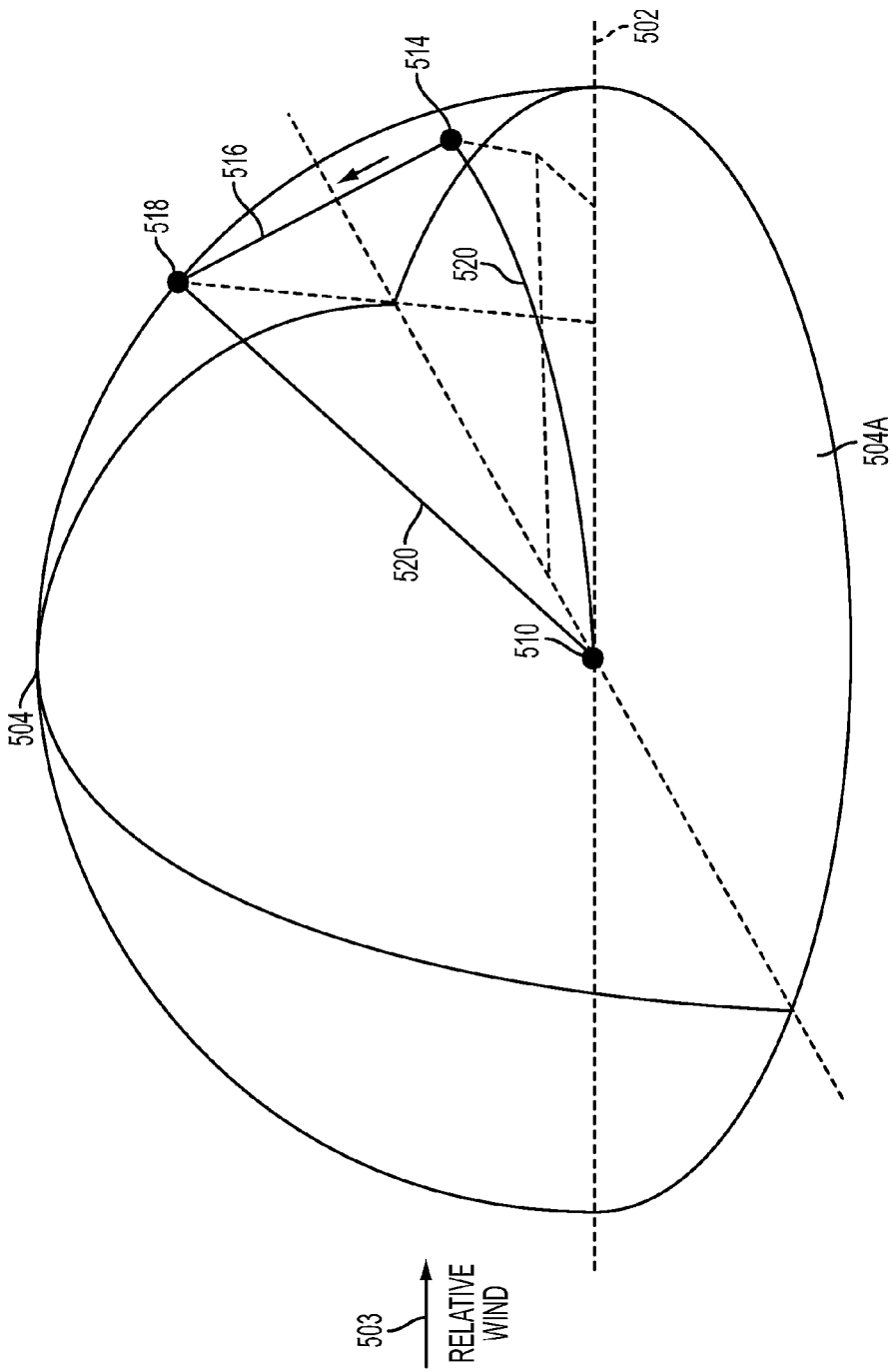

FIGS. 5a and 5b depict a tether sphere 504, according to an example embodiment. In particular, the tether sphere 504 has a radius based on a length of a tether 520, such as a length of the tether 520 when it is extended. As shown in FIGS. 5a and 5b, the tether 520 is connected to a ground station 510, and the ground station 510 is located on ground 502. Further, as shown in FIGS. 5a and 5b, relative wind 503 contacts the tether sphere 504. The relative wind 503 may be a relative wind from the perspective of the ground station 510. In FIGS. 5a and 5b, only a portion of the tether sphere 504 that is above the ground 502 is depicted. The portion may be described as one half of the tether sphere 504.

The ground 502 may take the form of or be similar in form to the ground 302, the tether sphere 504 may take the form of or be similar in form to the tether sphere 304, the ground station 510 may take the form of or be similar in form to the ground station 110 and/or the ground station 210, and the tether 520 may take the form of or be similar in form to the tether 120 and/or the tether 220.

Examples of transitioning an aerial vehicle between hover flight and crosswind flight described herein may be carried out in and/or substantially on a first portion 504A of the tether sphere 504. As shown in FIGS. 5a and 5b, the first portion 504A of the tether sphere 504 is substantially downwind of the ground station 510. The first portion 504A may be described as one quarter of the tether sphere 504. The first portion 504A of the tether sphere 504 may take the form of or be similar in form to the portion 304A of the tether sphere 304.

Moreover, examples of transitioning an aerial vehicle between hover flight and crosswind flight described herein may be carried out at a variety of locations in and/or on the first portion 504A of the tether sphere 504. For instance, as shown in FIG. 5a, while the aerial vehicle is in a hover-flight orientation, the aerial vehicle may be positioned at a point 508 that is substantially on the first portion 504A of the tether sphere 504.

Further, as shown in FIG. 5b, when the aerial vehicle transitions from the hover-flight orientation to a forward-flight orientation, the aerial vehicle may be positioned at a point 514 that is inside the first portion 504A of the tether sphere 504. Further still, as shown in FIG. 5b, when the aerial vehicle ascends in the forward-flight orientation to a point 518 that is substantially on the first portion 504A of the tether sphere 504, the aerial vehicle may follow a path 516. The path 516 may take the form of a variety of shapes. For instance, the path 516 may be a line segment, such as a chord of the tether sphere 504. And, in some situations, the path 516 may be a line segment that intersects one or more locations. In addition, the path 516 may be a curve. For example, the path 316 may be a curve that has a curvature based on a speed of the aerial vehicle 130 and a tangency of the path 516 at point 518. Other shapes and/or types of shapes are possible as well.

The point 508 may correspond to point 308 in example 300, the point 514 may correspond to point 314 in example 300, the point 518 may correspond to point 318C in example 300, and the path 516 may take the form of or be similar in form to the path 316.

Further, in accordance with this disclosure, the point 508 and the point 518 may be located at various locations that are substantially on the first portion 504A of the tether sphere 504, and the point 514 may be located at various locations that are inside the first portion 504A of the tether sphere 504.

In addition, in some examples, point 514 may be located at various locations that are substantially on the first portion 504A of the tether sphere 504.

D. Transitioning an Aerial Vehicle from Crosswind Flight to Hover Flight

Figure 6A:
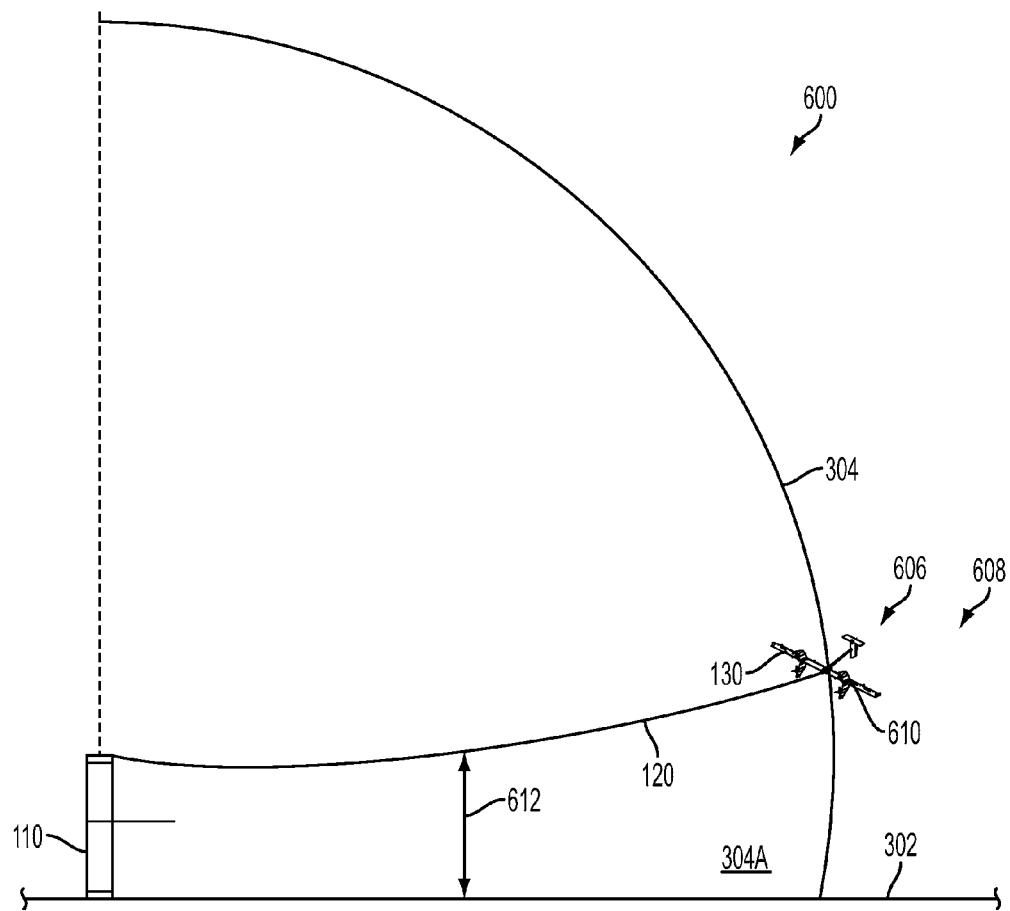
FIGS. 6a-c depict an example of an aerial vehicle transitioning from crosswind flight to hover flight, according to an example embodiment.
Figure 6B:
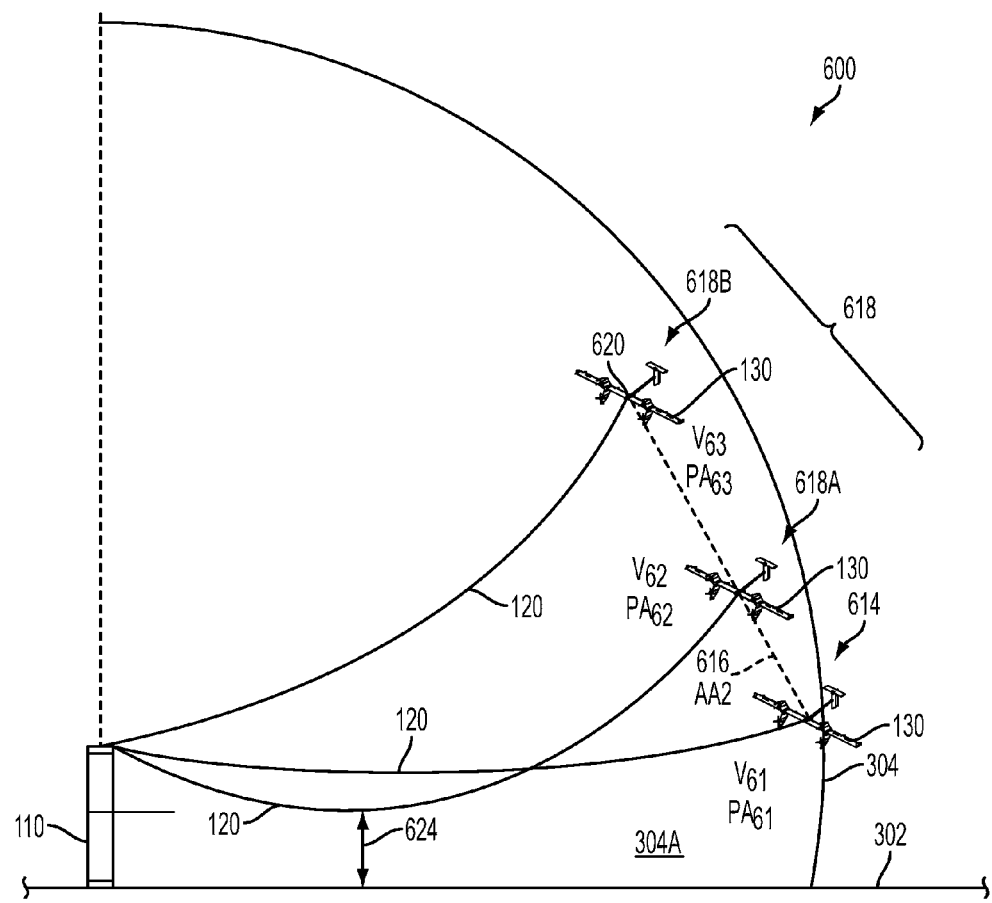
Figure 6C:
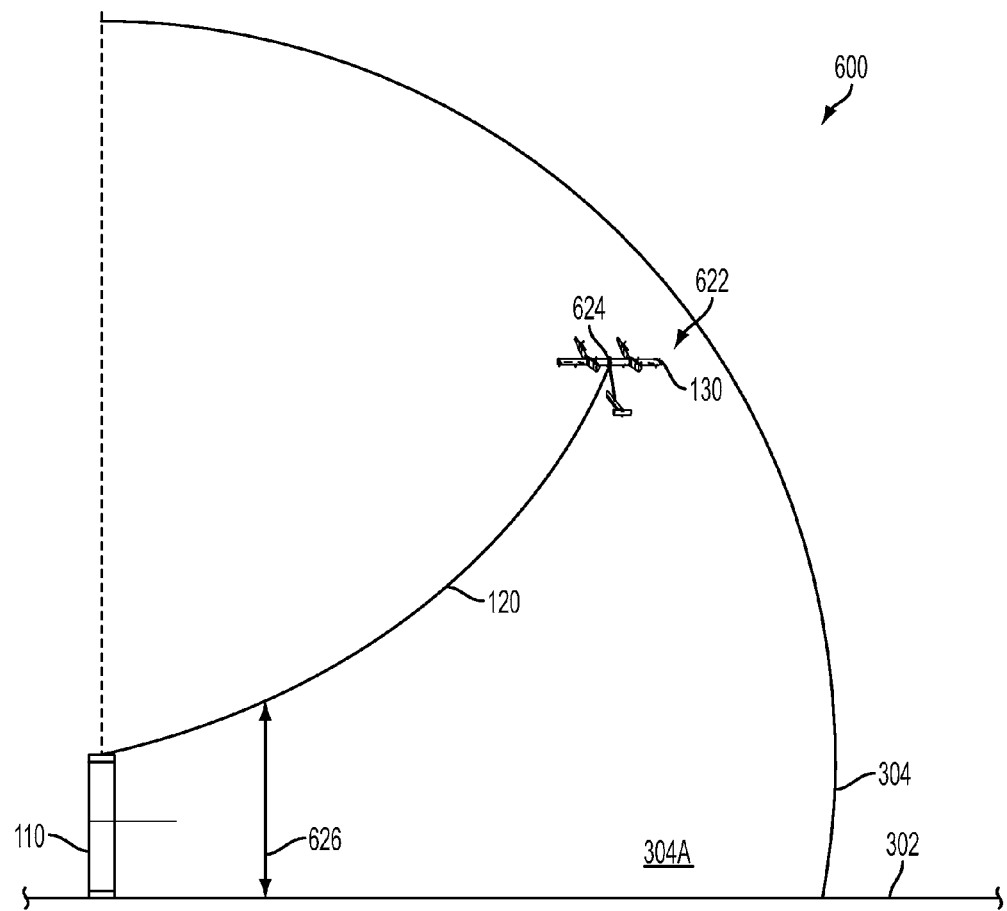

FIGS. 6a-c depict an example 600 of transitioning an aerial vehicle from crosswind flight to hover flight, according to an example embodiment. Example 600 is generally described by way of example as being carried out by the aerial vehicle 130 described above in connection with FIG. 1. For illustrative purposes, example 600 is described in a series of actions of the aerial vehicle 130 as shown in FIGS. 6a-c, though example 600 could be carried out in any number of actions and/or combination of actions.

As shown in FIG. 6a, the aerial vehicle 130 is connected to the tether 120, and the tether 120 is connected to the ground station 110. The ground station 110 is located on the ground 302. Moreover, as shown in FIG. 6a, the tether 120 defines the tether sphere 304. Example 600 may be carried out in and/or substantially on the portion 304A of the tether sphere 304.

Example 600 begins at a point 606 with operating the aerial vehicle 130 in a crosswind-flight orientation. When the aerial vehicle is in the crosswind-flight orientation, the aerial vehicle 130 may engage in crosswind flight. Moreover, at point 606 the tether 120 may be extended.

Example 600 continues at a point 608 with while the aerial vehicle 130 is in the crosswind-flight orientation, positioning the aerial vehicle 130 at a first location 610 that is substantially on the tether sphere 304. (In some examples, the first location 610 may be referred to as a third location). As shown in FIG. 6a, the first location 610 may be in the air and substantially downwind of the ground station 110. The first location 610 may take the form of or be similar in form to the first location 310. However, in some examples, the first location 610 may have an altitude that is greater or less than an altitude of the first location 310.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

Moreover, at point 606 and point 608, a bottom of the tether 120 may be at a predetermined altitude 612 above the ground 302. With this arrangement, at point 606 and point 608 the tether 120 may not contact the ground 302. The predetermined altitude 612 may be greater than, less than, and/or equal to the predetermined altitude 312.

Example 600 continues at a point 614 with transitioning the aerial vehicle from the crosswind-flight orientation to a forward-flight orientation, such that the aerial vehicle 130 moves from the tether sphere 120. As shown in FIG. 6b, the aerial vehicle 130 may move from the tether sphere 304 to a location toward the ground station 110.

When the aerial vehicle 130 is in the forward-flight orientation, the aerial vehicle may engage in forward flight. In some examples, transitioning the aerial vehicle 130 from the crosswind-flight orientation to the forward-flight orientation may involve a flight maneuver, such as pitching forward. Further, in such an example, the flight maneuver may be executed within a time period, such as less than one second.

At point 614, the aerial vehicle 130 may achieve attached flow. Further, at point 614, a tension of the tether 120 may be reduced. With this arrangement, a curvature of the tether 120 at point 614 may be greater than a curvature of the tether 120 at point 608.

Example 600 continues at one or more points 618 with operating the aerial vehicle 130 in the forward-flight orientation to ascend at an angle of ascent AA2 to a second location 620. (In some examples, the second location 620 may be referred to as a fourth location). As shown in FIG. 6b, the aerial vehicle 130 may fly substantially along a path 616 during the ascent at one or more points 618. In this example, one or more points 618 includes two points, a point 618A and point 618B. However, in other examples, one or more points 618 may include less than two or more than two points.

In some examples, the angle of ascent AA2 may be an angle between the path 618 and the ground 302. Further, the path 616 may take various different forms in various different embodiments. For instance, the path 616 may be a line segment, such as a chord of the tether sphere 304. Other shapes and/or types of shapes are possible as well. The angle of ascent AA2 may take the form of or be similar in form to the angle of ascent AA1, and the path 616 may take the form of or be similar in form to the path 316.

In some implementations, at one or more points 618, the aerial vehicle 130 may ascend with substantially no thrust provided by the rotors 134A-D of the aerial vehicle 130. With this arrangement, the aerial vehicle 130 may decelerate during the ascent. For instance, at one or more points 618, the rotors 134A-D of the aerial vehicle 130 may be shutoff. The term "substantially no," as used in this disclosure, refers to exactly no and/or one or more deviations from exactly no that do not significantly impact transitioning an aerial vehicle between certain flight modes as described herein.

Moreover, in some implementations, the aerial vehicle 130 may have attached flow during the ascent. And in such an implementation, effectiveness of one or more control surfaces of the aerial vehicle 130 may be maintained. Further, in such an implementation, example 600 may involve selecting a maximum angle of ascent, such that the aerial vehicle 130 has attached flow during the ascent. Moreover, in such an implementation, example 600 may involve adjusting a pitch angle of the aerial vehicle based on the maximum angle of ascent and/or adjusting thrust of the aerial vehicle 130 based on the maximum angle of ascent. In some examples, the adjusting thrust of the aerial vehicle 130 may involve using differential thrusting of one or more of the rotors 134A-D of the aerial vehicle 130.

As shown in FIG. 6b, at point 614 the aerial vehicle 130 may have a speed V61 and a pitch angle PA61; at point 618A the aerial vehicle 130 may have a speed V62 and a pitch angle PA62; and at point 618B the aerial vehicle 130 may have a speed V63 and a pitch angle PA63.

In some implementations, the angle of ascent AA2 may be selected before point 618A. With this arrangement, the pitch angle PA61 and/or the pitch angle PA62 may be selected based on the angle of ascent AA2. Further, in some examples, the pitch angle PA62 and the pitch angle PA63 may be equal to the pitch angle PA61. However, in other examples, the pitch angles PA61, PA62, and PA63 may be different than each other. For instance, PA61 may be greater or less than PA62 and/or PA63; PA62 may be greater or less than PA63 and/or PA61; and PA63 may be greater or less than PA61 and/or PA62. Further, PA63 may be selected and/or adjusted during the ascent. Further still, PA61 and/or PA62 may be adjusted during the ascent.

Moreover, in some implementations, the speed V61 and/or the speed V62 may be selected based on the angle of ascent AA2. Further, in some examples, the speed V62, and the speed V63 may be equal to the speed V61. However, in other examples, the speeds V61, V62, V63 may be different than each other. For example, the speed V63 may be less than the speed V62, and the speed V62 may be less than the speed V61. Further, speeds V61, V62, and V63 may be selected and/or adjusted during the ascent.

In some implementations, any of speeds V61, V62, and/or V63 may be a speed that corresponds with a minimum (or no) throttle of the aerial vehicle 130. Further, in some implementations, at the speed V62, the aerial vehicle 130 may ascend in a forward-flight orientation. Moreover, at the speed V62, the angle of ascent AA2 may be converged. As shown in FIG. 6, the second location 620 may be in the air and substantially downwind of the ground station 110. In addition, as shown in FIG. 6*b*, the second location 620 may be substantially upwind of the first location 610. The second location 620 may be oriented with respect to the ground station 110 a similar way as the first location 610 may be oriented with respect to the ground station 110.

For example, the first location 610 may be at a first angle from an axis that is substantially parallel to the ground 302. In some implementations, the angle may be 30 degrees from the axis. In some situations, the first angle may be referred to as azimuth, and the first angle may be between 30 degrees clockwise from the axis and 330 degrees clockwise from the axis, such as 15 degrees clockwise from the axis or 345 degrees clockwise from the axis.

As another example, the first location 610 may be at a second angle from the axis. In some implementations, the second angle may be 10 degrees from the axis. In some situations, the second angle may be referred to as elevation, and the second angle may be between 10 degrees in a direction above the axis and 10 degrees in a direction below the axis.

At one or more points 618, a tension of the tether 120 may increase during the ascent. For example, a tension of the tether 120 at point 618B may be greater than a tension of the tether at point 618A, and a tension of the tether at point 618A may be greater than a tension of the tether at point 614.

With this arrangement, a curvature of the tether 120 may decrease during the ascent. For example, a curvature of the tether 120 at point 618B may be less than a curvature of the tether 120 at point 618A. Further, in some examples, a curvature of the tether 120 at point 618A may be less than a curvature of the tether 120 at point 614.

Moreover, in some examples, when the aerial vehicle 130 includes a GPS receiver, operating the aerial vehicle 130 in the forward-flight orientation to ascend at an angle of ascent may involve monitoring the ascent of the aerial vehicle with the GPS receiver. With such an arrangement, control of a trajectory of the aerial vehicle 130 during the ascent may be improved. As a result, the aerial vehicle 130's ability to follow one or more portions and/or points of the path 616 may be improved.

Further, in some examples, when the aerial vehicle 130 includes at least one pitot tube, operating the aerial vehicle 130 in the forward-flight orientation to ascend at an angle of ascent may involve monitoring an angle of attack of the aerial vehicle 130 or a side slip of the aerial vehicle 130 during the ascent with the at least one pitot tube. With such an arrangement, control of the trajectory of the aerial vehicle 130 during the ascent may be improved. As a result, the aerial vehicle's ability to follow one or more portions and/or points of the path 616 may be improved.

Moreover, as shown in FIG. 6*b*, at point 614 and point 618 a bottom of the tether 120 may be a predetermined altitude 624 above the ground 302. With this arrangement, at point 614 and point 618 the tether 120 may not touch the ground 302. In some examples, the predetermined altitude 624 may be less than the predetermined altitude 612. And the predetermined altitude 624 may be greater than, less than, and/or equal to the predetermined the predetermined altitude 324. In some implementations, the predetermined altitude 624 may be greater than one half of the height of the ground station 110. And in at least one such implementation, the predetermined altitude 624 may be 6 meters.

Example 600 continues at a point 622 with transitioning the aerial vehicle 130 from the forward-flight orientation to a hover-flight orientation. In some examples, transitioning the aerial vehicle 130 from the forward-flight orientation to the hover-flight orientation may involve a flight maneuver. Further, transitioning the aerial vehicle 130 from the forward-flight orientation to the hover-flight orientation may occur when the aerial vehicle 130 has a threshold speed, such as 15 m/s. In some implementations, transitioning the aerial vehicle 130 from the forward-flight orientation to the hover-flight orientation may occur when the speed V63 is 15 m/s. Further, at point 622, a tension of the tether 120 may be greater than a tension of the tether at point 618B.

During the transition from the forward-flight orientation to the hover-flight orientation, the aerial vehicle 130 may be positioned at third location 624 (In some examples, the third location 624 may be referred to as a fifth location). As shown in FIG. 6*c*, the third location 624 may be in the air and substantially downwind of the ground station 110. In some implementations, the third location 624 could be the same as or similar to the second location 620. Further, in some implementations, the third location 624 may not be substantially on the tether sphere 304. When the third location 624 is not substantially on the tether sphere 304, after point 622 the aerial vehicle 130 may be blown by the wind to a fourth location (not shown) that is substantially on the tether sphere 304.

Moreover, as shown in FIG. 6*c*, at point 622 a bottom of the tether 120 may be a predetermined altitude 626 above the ground 302. With this arrangement, at point 626 the tether 120 may not touch the ground 302. In some examples, the predetermined altitude 626 may be greater than the predetermined altitude 612 and/or the predetermined altitude 624.

Thus, example 600 may be carried out so that the tether 120 may not contact the ground 602. With such an arrangement, the mechanical integrity of the tether 120 may be improved. For example, the tether 120 might not catch on (or tangle around) objects located on the ground 302. As another example, when the tether sphere 304 is located above a body of water described herein, the tether 120 might not be submersed in the water. In addition, with such an arrangement, safety of one or more people located near the ground station 110 (e.g., within the portion 304A of the tether sphere 304) may be improved.

In addition, example 600 may be carried out so that a bottom of the tether 120 remains above the predetermined altitude 624. With such an arrangement, the mechanical integrity of the tether 120 may be improved as described herein and/or safety of one or more people located near the ground station may be improved.

Moreover, one or more actions that correspond with points 606-622 may be performed at various different time periods in various different embodiments. For instance, the one or more actions that correspond with point 606 may be performed at a first time period, the one or more actions that correspond with point 608 may be performed at a second time period, the one or more actions that correspond with point 614 may be performed at a third time period, the one or more actions that correspond with point 618A may be performed at a fourth time period, the one or more actions that correspond with point 618B may be performed at a fifth time period, and the one or more actions that correspond with point 622 may be performed at a seventh time period. However, in other examples, at least some of the actions of the one or more actions that correspond with points 606-622 may be performed concurrently.

Although example 600 has been described above with reference to FIGS. 6*a*-*c*, in accordance with this disclosure, point 608 and point 622 may occur at various locations that are substantially on the portion 304A of the tether sphere 304, and point 614 and one or more points 618 may occur at various locations that are inside the portion 304A of the tether sphere.

Further, although at point 614 the aerial vehicle 130 has been described as moving from the tether sphere 304, in other examples at point 614 the aerial vehicle 130 may not move from the tether sphere 304. For instance, at point 614 the aerial vehicle 130 may not move from the tether sphere 304 during certain wind conditions, such as when the apparent wind has a speed between 15 to 20 m/s. Instead, at point 614 the aerial vehicle 130 may transition from the hover-flight orientation to a forward-flight orientation, such that a tension in the tether is reduced. With this arrangement, a curvature of the tether 120 at point 614 may be greater than a curvature of the tether 120 at point 608. And in some such examples, transitioning the aerial vehicle 130 from the crosswind-flight orientation to the forward-flight orientation may involve a flight maneuver, such as pitching forward. Further, in some such examples, the flight maneuver may be executed within a time period, such as less than one second.

Moreover, in some such examples, example 600 may continue at one or more points 618, with operating the aerial vehicle 130 in the forward-flight orientation to ascend at an angle of ascent to a second location. The second location may be substantially on the tether sphere. Further, in some such examples, at point 614 when the aerial vehicle 130 transitions from the hover-flight orientation to a forward-flight orientation, such that a tension in the tether is reduced, at one or more points 618 the aerial vehicle may fly substantially along a path that may be substantially on a portion of the tether sphere 304, such as a portion of the tether sphere 304 between the first location 610 and the second location. With this arrangement, at one or more points 618 a tension of the tether 120 may increase during the ascent, a curvature of the tether 120 may decrease during the ascent, and a speed of the aerial vehicle 130 may decrease during the ascent. And in some such examples, example 600 may continue at point 622 with transitioning the aerial vehicle 130 from the forward-flight orientation to a hover-flight orientation.

However, in other such examples, example 600 may continue at one or more points 618, with operating the aerial vehicle 130 in the forward-flight orientation to ascend at an angle of ascent to the second location 620 as described above, and may continue at point 622 with transitioning the aerial vehicle 130 from the forward-flight orientation to a hover-flight orientation as described above. With this arrangement, at point 614 when the aerial vehicle 130 transitions from the hover-flight orientation to a forward-flight orientation, such that a tension in the tether is reduced, at one or more points 618 the aerial vehicle 130 may fly substantially along the path 616 during the ascent.

Further still, although example 600 has described with the ground station 110 located on the ground 302, in other examples the ground station 110 may be mobile. For instance, the ground station 110 may be configured to move relative to the ground 302 or a surface of a body of water.

III. ILLUSTRATIVE METHODS

A. Hover Flight to Crosswind Flight

Figure 7A:
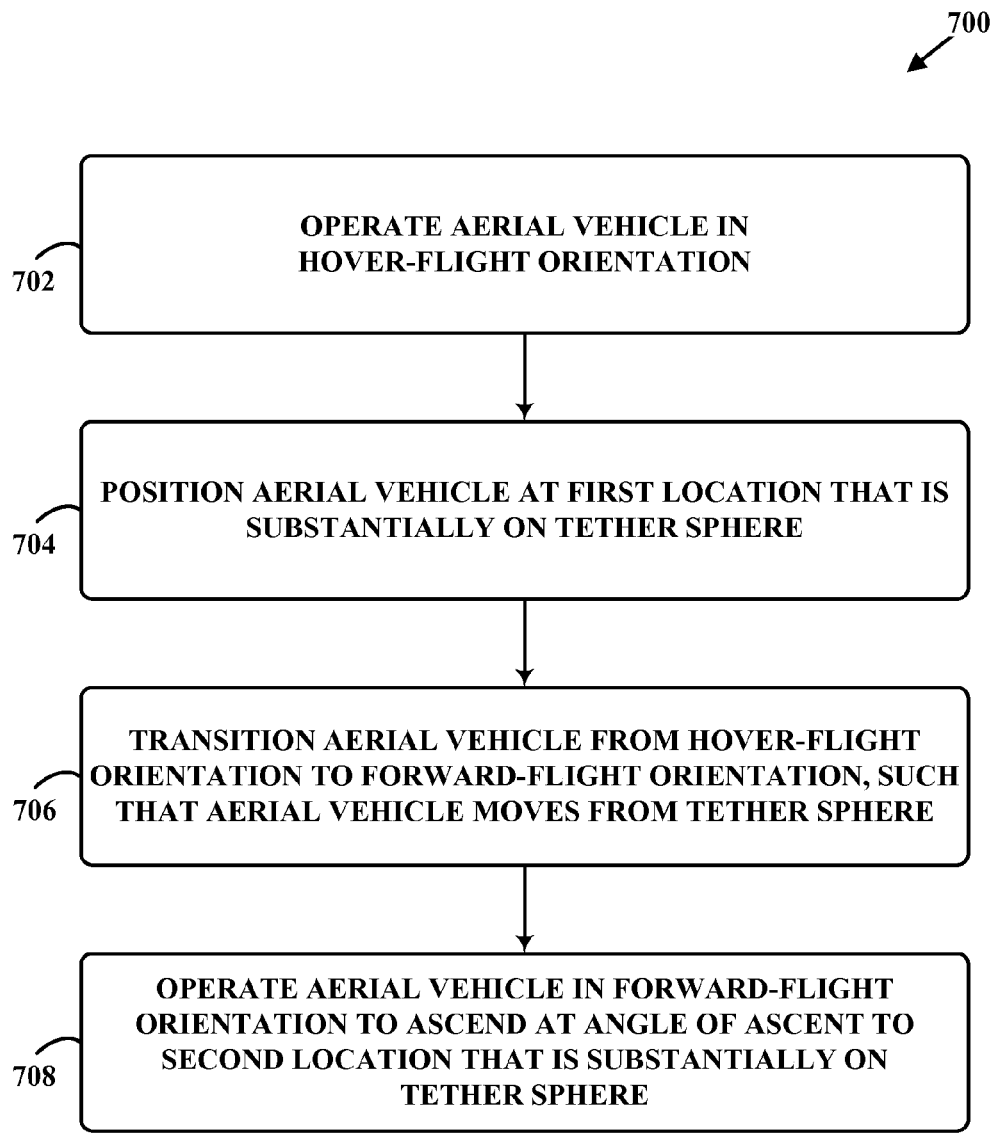
FIG. 7a is a flowchart of a method, according to an example embodiment.

FIG. 7a is a flowchart illustrating a method 700, according to an example embodiment. The method 700 may be used in transitioning an aerial vehicle from hover flight to crosswind flight. Illustrative methods, such as method 700, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 700 may be performed by the control system 248. For simplicity, method 700 may be described generally as being carried out by an aerial vehicle, such as the aerial vehicle 130 and/or the aerial vehicle 230. However, it should be understood that example methods, such as method 700, may be carried out by other entities or combinations of entities without departing from the scope of the disclosure.

As shown by block 702, method 700 involves operating an aerial vehicle in a hover-flight orientation, wherein the aerial vehicle is connected to a tether that defines a tether sphere having a radius based on a length of the tether, wherein the tether is connected to a ground station. At block 702, the aerial vehicle may be operated the same or similar way as the aerial vehicle 130 may be operated at point 306 as described with reference to FIG. 3a.

As shown by block 704, method 700 involves while the aerial vehicle is in the hover-flight orientation, positioning the aerial vehicle at a first location that is substantially on the tether sphere, wherein the first location is substantially downwind of the ground station. At block 704, the aerial vehicle may be positioned the same or similar way as the aerial vehicle 130 may be positioned at point 308 as described with reference to FIG. 3a.

As shown by block 706, method 700 involves transitioning the aerial vehicle from the hover-flight orientation to a forward-flight orientation, such that the aerial vehicle moves from the tether sphere, wherein the aerial vehicle has attached flow, and wherein a tension of the tether is reduced. At block 706, the aerial vehicle may be transitioned the same or similar way as the aerial vehicle 130 may be transitioned at point 314 as described with reference to FIG. 3b.

As shown by block 708, method 700 involves operating the aerial vehicle in the forward-flight orientation to ascend at an angle of ascent to a second location that is substantially on the tether sphere, wherein the second location is substantially downwind of the ground station. At block 708, the aerial vehicle may be operated the same or similar way as the aerial vehicle 130 may be operated at one or more points 318 as described with reference to FIG. 3b.

For instance, in some embodiments, the aerial vehicle may have attached flow during the ascent. Moreover, in some embodiments, operating the aerial vehicle in the forward-flight orientation to ascend at the angle of ascent to the second location may involve selecting a maximum angle of ascent, such that the aerial vehicle has attached flow during the ascent. And in at least one such embodiment, operating the aerial vehicle in the forward-flight orientation to ascend at the angle ascent to the second location may involve adjusting a pitch angle of the aerial vehicle based on a maximum angle of ascent. Further, in at least one such embodiment, operating the aerial vehicle in the forward-flight orientation to ascend at the angle of ascent to the second location may involve adjusting thrust of the aerial vehicle based on the maximum angle of ascent. Further still, in at least one such embodiment, operating the aerial vehicle in the forward-flight orientation to ascend at the angle of ascent to the second location may involve operating the aerial vehicle at a speed that corresponds with a maximum throttle of the aerial vehicle.

Further, in some embodiments, the tension of the tether may increase during the ascent. Further still, in some embodiments, when the aerial vehicle includes a GPS receiver, operating the aerial vehicle in the forward-flight orientation to ascend at an angle of ascent may involve monitoring the ascent of the aerial vehicle with the GPS receiver.

Moreover, in some embodiments, when the aerial vehicle includes at least one pitot tube, operating the aerial vehicle in the forward-flight orientation to ascend at an angle of ascent may involve monitoring an angle of attack of the aerial vehicle or a side slip of the aerial vehicle during the ascent with the at least one pitot tube. Further, in some embodiments, the second location may be substantially upwind of the first location.

Further still, in some embodiments, method 700 may be carried out so that the tether does not contact the ground. Moreover, in some embodiments, method 700 may be carried out so that a bottom of the tether remains above a predetermined altitude.

Moreover, in some embodiments, method 700 may further involve transitioning the aerial vehicle from the forward-flight orientation to a crosswind-flight orientation. In at least one such embodiment, the aerial vehicle may be transitioned the same or similar way as the aerial vehicle 130 may be transitioned at point 322 as described with reference to FIG. 3*b*.

And in some embodiments, method 700 may further involve deploying the aerial vehicle from a ground station in the hover-flight orientation. In at least one such embodiment, the aerial vehicle may be deployed the same or similar way as the aerial vehicle 130 may be deployed at point 306 as described with reference to FIG. 3*a*.

Figure 7B:
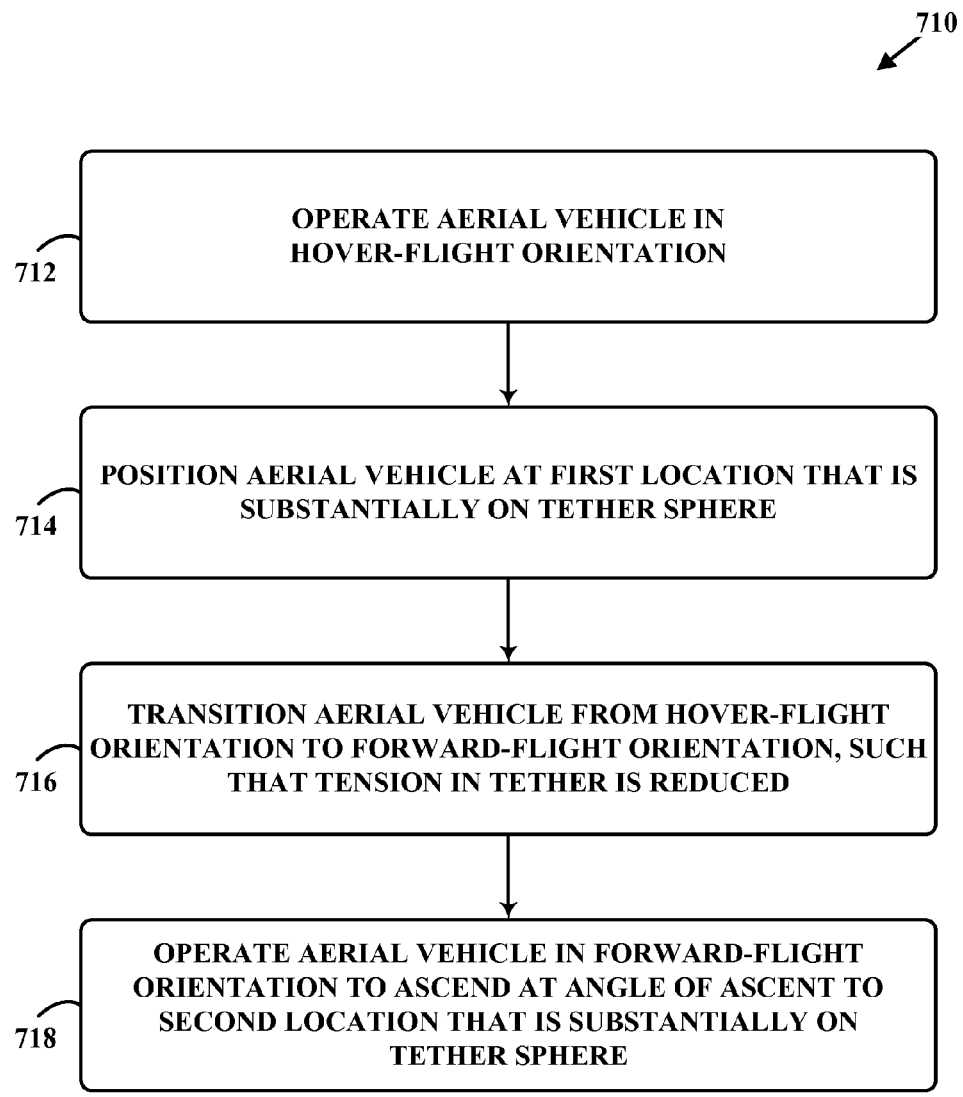
FIG. 7b is a flowchart of another method, according to an example embodiment.

FIG. 7*b* is a flowchart illustrating a method 710, according to an example embodiment. The method 710 may be used in transitioning an aerial vehicle from hover flight to crosswind flight. Illustrative methods, such as method 710, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 710 may be performed by the control system 248. For simplicity, method 710 may be described generally as being carried out by an aerial vehicle, such as the aerial vehicle 130 and/or the aerial vehicle 230. However, it should be understood that example methods, such as method 710, may be carried out by other entities or combinations of entities without departing from the scope of the disclosure.

As shown by block 712, method 710 involves operating an aerial vehicle in a hover-flight orientation, wherein the aerial vehicle is connected to a tether that defines a tether sphere having a radius based on a length of the tether, wherein the tether is connected to a ground station. At block 712, the aerial vehicle may be operated the same or similar way as the aerial vehicle 130 may be operated at point 306 as described with reference to FIG. 3*a*.

As shown by block 714, method 710 involves while the aerial vehicle is in the hover-flight orientation, positioning the aerial vehicle at a first location that is substantially on the tether sphere, wherein the first location is substantially downwind of the ground station. At block 714, the aerial vehicle may be positioned the same or similar way as the aerial vehicle 130 may be positioned at point 308 as described with reference to FIG. 3*a*.

As shown by block 716, method 700 involves transitioning the aerial vehicle from the hover-flight orientation to a forward-flight orientation, such that a tension of the tether is reduced, wherein the aerial vehicle has attached flow. At block 716, the aerial vehicle may be transitioned the same or similar way as the aerial vehicle 130 may be transitioned at point 314 as described with reference to FIG. 3*b*. For instance, at block 716, the aerial vehicle may not move from the tether sphere.

As shown by block 718, method 710 involves operating the aerial vehicle in the forward-flight orientation to ascend at an angle of ascent to a second location that is substantially on the tether sphere, wherein the second location is substantially downwind of the ground station. At block 718, the aerial vehicle may be operated the same or similar way as the aerial vehicle 130 may be operated at one or more points 318 as described with reference to FIG. 3*b*.

For instance, in some embodiments, the aerial vehicle may have attached flow during the ascent. Moreover, in some embodiments, operating the aerial vehicle in the forward-flight orientation to ascend at the angle of ascent to the second location may involve selecting a maximum angle of ascent, such that the aerial vehicle has attached flow during the ascent. And in at least one such embodiment, operating the aerial vehicle in the forward-flight orientation to ascend at the angle ascent to the second location may involve adjusting a pitch angle of the aerial vehicle based on a maximum angle of ascent. Further, in at least one such embodiment, operating the aerial vehicle in the forward-flight orientation to ascend at the angle of ascent to the second location may involve adjusting thrust of the aerial vehicle based on the maximum angle of ascent. Further still, in at least one such embodiment, operating the aerial vehicle in the forward-flight orientation to ascend at the angle of ascent to the second location may involve operating the aerial vehicle at a speed that corresponds with a maximum throttle of the aerial vehicle.

Further, in some embodiments, operating the aerial vehicle in the forward-flight orientation to ascend at an angle of ascent to the second location may involve operating the aerial vehicle substantially along a portion of the tether sphere.

Further still, in some embodiments, the tension of the tether may increase during the ascent. And, in some embodiments, when the aerial vehicle includes a GPS receiver, operating the aerial vehicle in the forward-flight orientation to ascend at an angle of ascent may involve monitoring the ascent of the aerial vehicle with the GPS receiver.

Moreover, in some embodiments, when the aerial vehicle includes at least one pitot tube, operating the aerial vehicle in the forward-flight orientation to ascend at an angle of ascent may involve monitoring an angle of attack of the aerial vehicle or a side slip of the aerial vehicle during the ascent with the at least one pitot tube. Further, in some embodiments, the second location may be substantially upwind of the first location.

Further, in some embodiments, method 710 may be carried out so that the tether does not contact the ground. Moreover, in some embodiments, method 700 may be carried out so that a bottom of the tether remains above a predetermined altitude.

Further still, in some embodiments, method 710 may further involve transitioning the aerial vehicle from the forward-flight orientation to a crosswind-flight orientation. In at least one such embodiment, the aerial vehicle may be transitioned the same or similar way as the aerial vehicle 130 may be transitioned at point 322 as described with reference to FIG. 3*b*.

And in some embodiments, method 710 may further involve deploying the aerial vehicle from a ground station in the hover-flight orientation. In at least one such embodiment, the aerial vehicle may be deployed the same or similar way as the aerial vehicle 130 may be deployed at point 306 as described with reference to FIG. 3*a*.

B. Crosswind Flight to Hover Flight

Figure 8A:
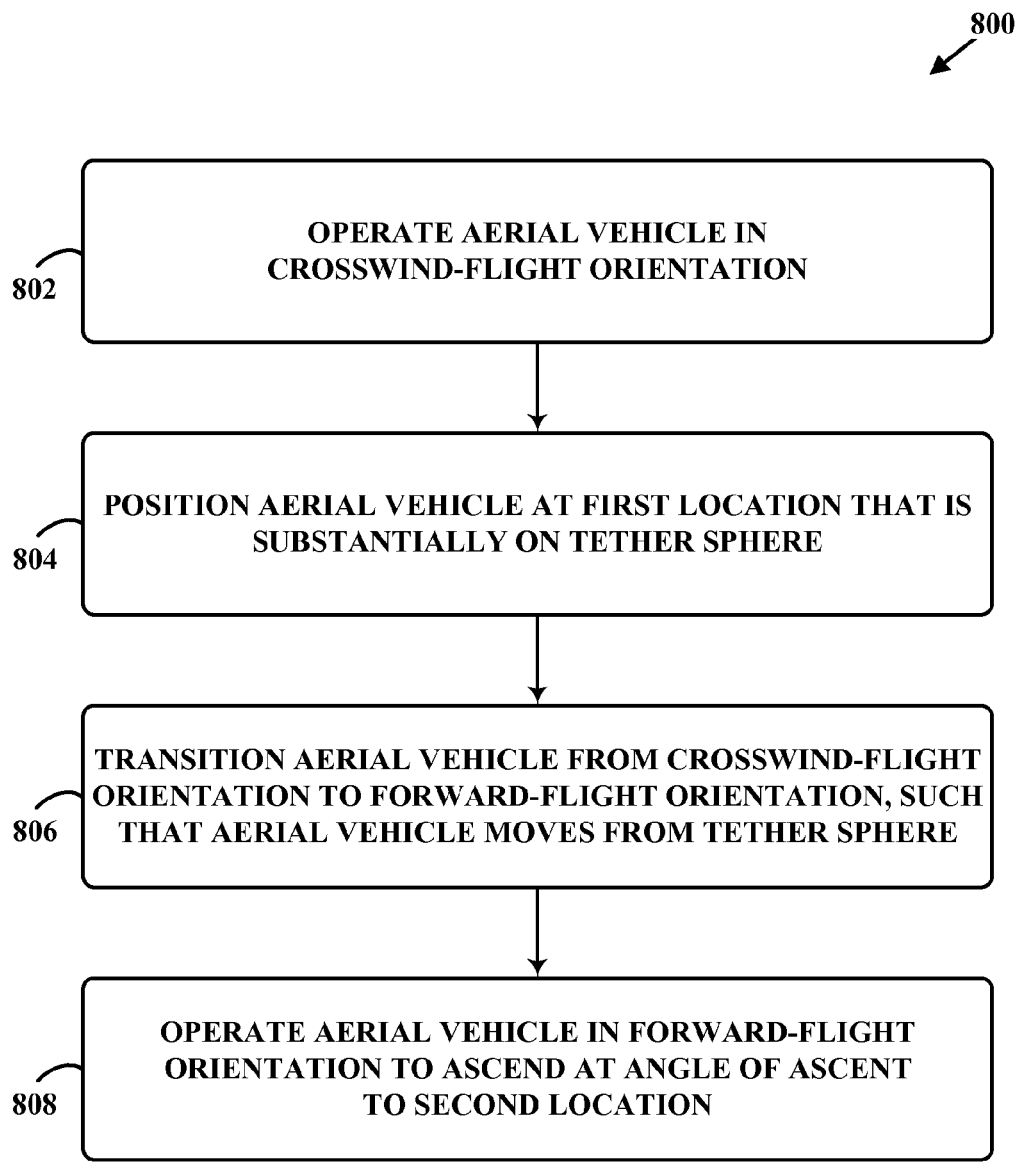
FIG. 8a is a flowchart of another method, according to an example embodiment.

FIG. 8*a* is a flowchart illustrating a method 800, according to an example embodiment. The method 800 may be used in transitioning an aerial vehicle from crosswind flight to hover flight. Illustrative methods, such as method 800, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 800 may be performed by the control system 248. For simplicity, method 800 may be described generally as being carried out by an aerial vehicle, such as the aerial vehicle 130 and/or the aerial vehicle 230. However, it should be understood that example methods, such as method 800, may be carried out by other entities or combinations of entities without departing from the scope of the disclosure.

As shown by block 802, method 800 involves operating an aerial vehicle in a crosswind-flight orientation, wherein the aerial vehicle is connected to a tether that defines a tether sphere having a radius based on a length of the tether, wherein the tether is connected to a ground station. At block 802, the aerial vehicle may be operated the same or similar way as the aerial vehicle 130 may be operated at point 606 as described with reference to FIG. 6*a*.

As shown by block 804, method 800 involves while the aerial vehicle is in the crosswind-flight orientation, positioning the aerial vehicle at a first location that is substantially on the tether sphere, wherein the first location is substantially downwind of the ground station. At block 804, the aerial vehicle may be positioned the same or similar way as the aerial vehicle 130 may be positioned at point 608 as described with reference to FIG. 6*a*.

As shown by block 806, method 800 involves transitioning the aerial vehicle from the crosswind-flight orientation to a forward-flight orientation, such that the aerial vehicle moves from the tether sphere, wherein the aerial vehicle has attached flow, and wherein a tension of the tether is reduced. At block 806, the aerial vehicle may be transitioned the same or similar way as the aerial vehicle 130 may be transitioned at point 614 as described with reference to FIG. 6*b*.

As shown by block 808, method 800 involves operating the aerial vehicle in the forward-flight orientation to ascend at an angle of ascent to a second location, wherein the second location is substantially downwind of the ground station. At block 808, the aerial vehicle may be operated the same or similar way as the aerial vehicle may be operated at one or more points 618 as described with reference to FIG. 6*b*.

For instance, in some embodiments, the aerial vehicle may have attached flow during the ascent. Moreover, in some embodiments, operating the aerial vehicle in the forward-flight orientation to ascend at the angle of ascent to the second location may involve selecting a maximum angle of ascent, such that the aerial vehicle has attached flow during the ascent. And in at least one such embodiment, operating the aerial vehicle in the forward-flight orientation to ascend at the angle ascent to the second location may involve adjusting a pitch angle of the aerial vehicle based on the maximum angle of ascent. Further, in at least one such embodiment, operating the aerial vehicle in the forward-flight orientation to ascend at the angle of ascent to the second location may involve adjusting thrust of the aerial vehicle based on the maximum angle of ascent. Further still, in at least one such embodiment, operating the aerial vehicle in the forward-flight orientation to ascend at the angle of ascent to the second location may involve operating the aerial vehicle with substantially no thrust.

Further, in some embodiments, the tension of the tether may increase during the ascent. Further still, in some embodiments, when the aerial vehicle includes a GPS receiver, operating the aerial vehicle in the forward-flight orientation to ascend at an angle of ascent may involve monitoring the ascent of the aerial vehicle with the GPS receiver.

Moreover, in some embodiments, when the aerial vehicle includes at least one pitot tube, operating the aerial vehicle in the forward-flight orientation to ascend at an angle of ascent may involve monitoring an angle of attack of the aerial vehicle or a side slip of the aerial vehicle during the ascent with the at least one pitot tube. Further, in some embodiments, the second location may be substantially upwind of the first location.

Further still, in some embodiments, method 800 may be carried out so that the tether does not contact the ground. Moreover, in some embodiments, method 800 may be carried out so that a bottom of the tether remains above a predetermined altitude.

And in some embodiments, method 800 may further involve transitioning the aerial vehicle from the forward-flight orientation to a hover-flight orientation. In at least one such embodiment, the aerial vehicle may be transitioned the same or similar way as the aerial vehicle 130 may be transitioned at point 622 as described with reference to FIG. 6*c*. For instance, in some embodiments, transitioning the aerial vehicle from the forward-flight orientation to the hover-flight orientation may involve transitioning the aerial vehicle from the forward-flight orientation to the hover-flight orientation when the aerial vehicle has a threshold speed. Further, in some embodiments, the transitioning the aerial vehicle from the forward-flight orientation to a hover-flight orientation comprises transitioning the aerial vehicle from the forward-flight orientation to a hover-flight orientation at a third location that is not substantially on the tether sphere.

Figure 8B:
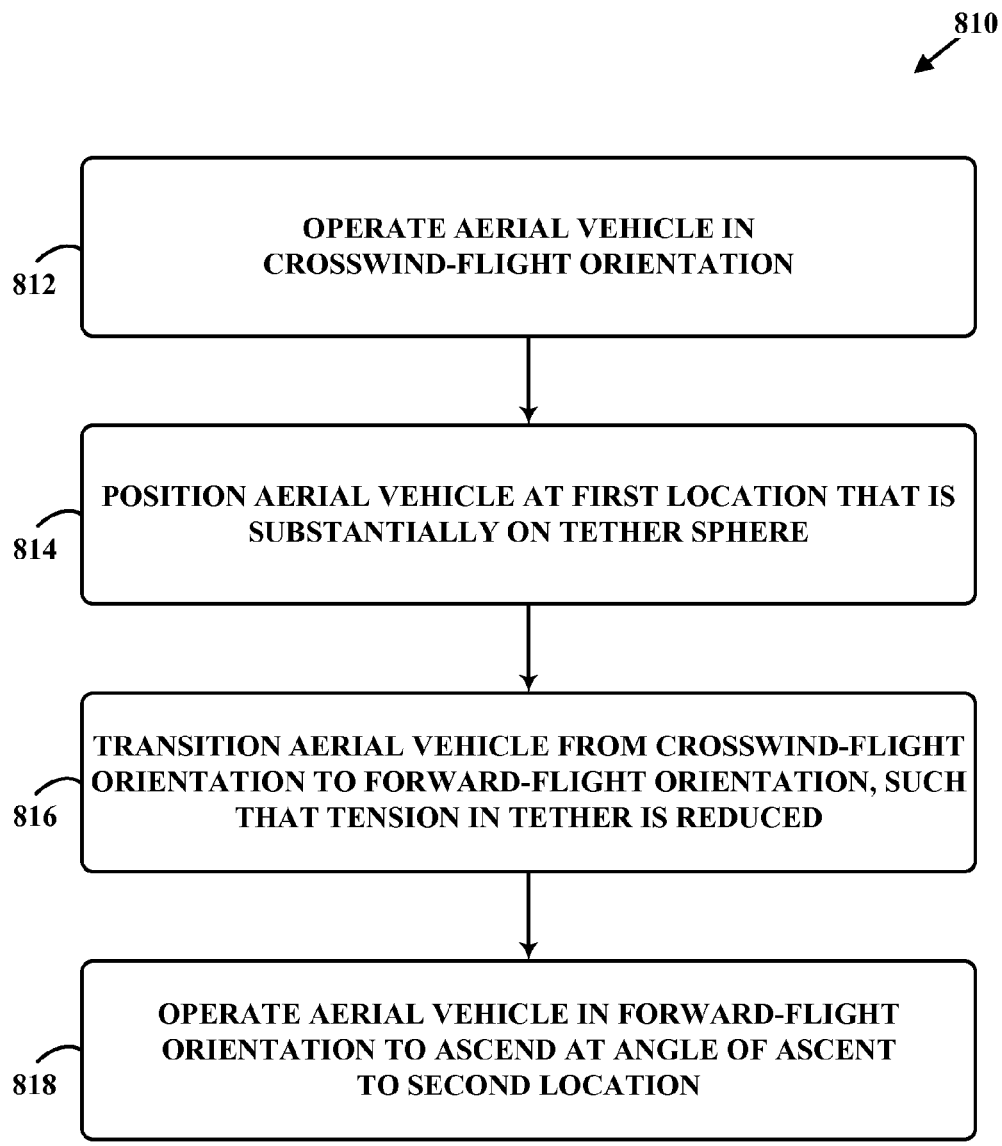
FIG. 8b is a flowchart of yet another method, according to an example embodiment.

FIG. 8*b* is a flowchart illustrating a method 810, according to an example embodiment. The method 810 may be used in transitioning an aerial vehicle from crosswind flight to hover flight. Illustrative methods, such as method 810, may be carried out in whole or in part by a component or components of an aerial vehicle, such as by the one or more components of the aerial vehicle 130 shown in FIG. 1, the aerial vehicle 230 shown in FIG. 2, the ground station 110 shown in FIG. 1, and the ground station 210 shown in FIG. 2. For instance, method 810 may be performed by the control system 248. For simplicity, method 810 may be described generally as being carried out by an aerial vehicle, such as the aerial vehicle 130 and/or the aerial vehicle 230. However, it should be understood that example methods, such as method 800, may be carried out by other entities or combinations of entities without departing from the scope of the disclosure.

As shown by block 812, method 810 involves operating an aerial vehicle in a crosswind-flight orientation, wherein the aerial vehicle is connected to a tether that defines a tether sphere having a radius based on a length of the tether, wherein the tether is connected to a ground station. At block 812, the aerial vehicle may be operated the same or similar way as the aerial vehicle 130 may be operated at point 606 as described with reference to FIG. 6*a*.

As shown by block 814, method 810 involves while the aerial vehicle is in the crosswind-flight orientation, positioning the aerial vehicle at a first location that is substantially on the tether sphere, wherein the first location is substantially downwind of the ground station. At block 804, the aerial vehicle may be positioned the same or similar way as the aerial vehicle 130 may be positioned at point 608 as described with reference to FIG. 6*a*.

As shown by block 816, method 800 involves transitioning the aerial vehicle from the crosswind-flight orientation to a forward-flight orientation, such that a tension of the tether is reduced, wherein the aerial vehicle has attached flow. At block 816, the aerial vehicle may be transitioned the same or similar way as the aerial vehicle 130 may be transitioned at point 614 as described with reference to FIG. 6*b*. For instance, at block 816, the aerial vehicle may not move from the tether sphere.

As shown by block 818, method 810 involves operating the aerial vehicle in the forward-flight orientation to ascend at an angle of ascent to a second location, wherein the second location is substantially downwind of the ground station. At block 818, the aerial vehicle may be operated the same or similar way as the aerial vehicle may be operated at one or more points 618 as described with reference to FIG. 6*b*.

For instance, in some embodiments, the aerial vehicle may have attached flow during the ascent. Moreover, in some embodiments, operating the aerial vehicle in the forward-flight orientation to ascend at the angle of ascent to the second location may involve selecting a maximum angle of ascent, such that the aerial vehicle has attached flow during the ascent. And in at least one such embodiment, operating the aerial vehicle in the forward-flight orientation to ascend at the angle ascent to the second location may involve adjusting a pitch angle of the aerial vehicle based on the maximum angle of ascent. Further, in at least one such embodiment, operating the aerial vehicle in the forward-flight orientation to ascend at the angle of ascent to the second location may involve adjusting thrust of the aerial vehicle based on the maximum angle of ascent. Further still, in at least one such embodiment, operating the aerial vehicle in the forward-flight orientation to ascend at the angle of ascent to the second location may involve operating the aerial vehicle with substantially no thrust.

Further, in some embodiments, operating the aerial vehicle in the forward-flight orientation to ascend at an angle of ascent to the second location may involve operating the aerial vehicle substantially along a portion of the tether sphere.

Further still, in some embodiments, the tension of the tether may increase during the ascent. And, in some embodiments, when the aerial vehicle includes a GPS receiver, operating the aerial vehicle in the forward-flight orientation to ascend at an angle of ascent may involve monitoring the ascent of the aerial vehicle with the GPS receiver.

Moreover, in some embodiments, when the aerial vehicle includes at least one pitot tube, operating the aerial vehicle in the forward-flight orientation to ascend at an angle of ascent may involve monitoring an angle of attack of the aerial vehicle or a side slip of the aerial vehicle during the ascent with the at least one pitot tube. Further, in some embodiments, the second location may be substantially upwind of the first location.

Further still, in some embodiments, method 810 may be carried out so that the tether does not contact the ground. Moreover, in some embodiments, method 810 may be carried out so that a bottom of the tether remains above a predetermined altitude.

And in some embodiments, method 810 may further involve transitioning the aerial vehicle from the forward-flight orientation to a hover-flight orientation. In at least one such embodiment, the aerial vehicle may be transitioned the same or similar way as the aerial vehicle 130 may be transitioned at point 622 as described with reference to FIG. 6*c*. For instance, in some embodiments, transitioning the aerial vehicle from the forward-flight orientation to the hover-flight orientation may involve transitioning the aerial vehicle from the forward-flight orientation to the hover-flight orientation when the aerial vehicle has a threshold speed. Further, in some embodiments, the transitioning the aerial vehicle from the forward-flight orientation to a hover-flight orientation comprises transitioning the aerial vehicle from the forward-flight orientation to a hover-flight orientation at a third location that is not substantially on the tether sphere.

VI. ILLUSTRATIVE NON-TRANSITORY COMPUTER READABLE MEDIA

Some or all of the functions described above and illustrated in FIGS. 7*a*, 7*b*, 8*a*, and 8*b* may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be the control system 248 as described and illustrated in reference to FIG. 2. Additionally or alternatively, the computing device could include another computing device, such as a server in a server network.

The non-transitory computer readable medium may store instructions executable by a processor (e.g. processor 242 and/or processor 212 as described in reference to FIG. 2) to perform various functions. The functions may include operating an aerial vehicle in a hover-flight orientation, wherein the aerial vehicle is connected to a tether that defines a tether sphere having a radius based on a length of the tether, wherein the tether is connected to a ground station; while the aerial vehicle is in the hover-flight orientation, positioning the aerial vehicle at first location that is substantially on the tether sphere, wherein the first location is substantially downwind of the ground station; transitioning the aerial vehicle from the hover-flight orientation to a forward-flight orientation, such that the aerial vehicle moves from the tether sphere, wherein the aerial vehicle has attached flow, and wherein a tension of the tether is reduced; and operating the aerial vehicle in the forward-flight orientation to ascend at an angle of ascent to a second location that is substantially on the tether sphere, wherein the second location is substantially downwind of the ground station.

Moreover, the functions may include operating an aerial vehicle in a hover-flight orientation, wherein the aerial vehicle is connected to a tether that defines a tether sphere having a radius based on a length of the tether, wherein the tether is connected to a ground station; while the aerial vehicle is in the hover-flight orientation, positioning the aerial vehicle at first location that is substantially on the tether sphere, wherein the first location is substantially downwind of the ground station; transitioning the aerial vehicle from the hover-flight orientation to a forward-flight orientation, such that a tension of the tether is reduced, wherein the aerial vehicle has attached flow; and operating the aerial vehicle in the forward-flight orientation to ascend at an angle of ascent to a second location that is substantially on the tether sphere, wherein the second location is substantially downwind of the ground station.

Further, the functions may include operating an aerial vehicle in a crosswind-flight orientation, wherein the aerial vehicle is connected to a tether that defines a tether sphere having a radius based on a length of the tether, wherein the tether is connected to a ground station; while the aerial vehicle is in the crosswind-flight orientation, positioning the aerial vehicle at a first location that is substantially on the tether sphere, wherein the first location is substantially downwind of the ground station; transitioning the aerial vehicle from the crosswind-flight orientation to a forward-flight orientation, such that the aerial vehicle moves from the tether sphere, wherein the aerial vehicle has attached flow, and wherein a tension of the tether is reduced; and operating the aerial vehicle in the forward-flight orientation to ascend at an angle of ascent to a second location, wherein the second location is substantially downwind of the ground station.

Further still, the functions may include operating an aerial vehicle in a crosswind-flight orientation, wherein the aerial vehicle is connected to a tether that defines a tether sphere having a radius based on a length of the tether, wherein the tether is connected to a ground station; while the aerial vehicle is in the crosswind-flight orientation, positioning the aerial vehicle at a first location that is substantially on the tether sphere, wherein the first location is substantially downwind of the ground station; transitioning the aerial vehicle from the crosswind-flight orientation to a forward-flight orientation, such that a tension of the tether is reduced, wherein the aerial vehicle has attached flow; and operating the aerial vehicle in the forward-flight orientation to ascend at an angle of ascent to a second location, wherein the second location is substantially downwind of the ground station.

VII. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

The invention claimed is:

1. A method comprising:
   operating an aerial vehicle in a crosswind-flight orientation, wherein the aerial vehicle is connected to a tether that defines a tether sphere having a radius based on a length of the tether, wherein the tether is connected to a ground station;
   while the aerial vehicle is in the crosswind-flight orientation, positioning the aerial vehicle at a first location that is substantially on the tether sphere, wherein the first location is substantially downwind of the ground station;
   transitioning the aerial vehicle from the crosswind-flight orientation to a forward-flight orientation, such that the aerial vehicle moves from the tether sphere, wherein the aerial vehicle has attached flow, and wherein a tension of the tether is reduced; and
   operating the aerial vehicle in the forward-flight orientation to ascend at an angle of ascent to a second location, wherein the second location is substantially downwind of the ground station, wherein the tension of the tether increases during the ascent.

2. The method of claim 1, wherein the aerial vehicle has attached flow during the ascent.

3. The method of claim 1, wherein operating the aerial vehicle in the forward-flight orientation to ascend at the angle of ascent to the second location comprises selecting a maximum angle of ascent, such that the aerial vehicle has attached flow during the ascent.

4. The method of claim 3, wherein operating the aerial vehicle in the forward-flight orientation to ascend at the angle of ascent to the second location comprises adjusting a pitch angle of the aerial vehicle based on the maximum angle of ascent.

5. The method of claim 3, wherein operating the aerial vehicle in the forward-flight orientation to ascend at the angle of ascent to the second location comprises adjusting thrust of the aerial vehicle based on the maximum angle of ascent.

6. The method of claim 1, wherein operating the aerial vehicle in the forward-flight orientation to ascend at the angle of ascent to the second location comprises operating the aerial vehicle with substantially no thrust.

7. The method of claim 1, wherein the aerial vehicle comprises a global positioning system (GPS) receiver, and wherein operating the aerial vehicle in the forward-flight orientation to ascend at an angle of ascent comprises monitoring the ascent of the aerial vehicle with the GPS receiver.

8. The method of claim 1, wherein the aerial vehicle comprises at least one pitot tube, and wherein operating the aerial vehicle in the forward-flight orientation to ascend at an angle of ascent comprises monitoring an angle of attack of the aerial vehicle or a slide slip of the aerial vehicle during the ascent with the at least one pitot tube.

9. The method of claim 1, wherein the second location is substantially upwind of the first location.

10. The method of claim 1, wherein the tether does not contact the ground.

11. The method of claim 1, wherein a bottom of the tether remains above a predetermined altitude.

12. The method of claim 1, further comprising transitioning the aerial vehicle from the forward-flight orientation to a hover-flight orientation.

13. The method of claim 12, wherein transitioning the aerial vehicle from the forward-flight orientation to the hover-flight orientation comprises transitioning the aerial vehicle from the forward-flight orientation to the hover-flight orientation when the aerial vehicle has a threshold speed.

14. The method of claim 12, wherein the transitioning the aerial vehicle from the forward-flight orientation to the hover-flight orientation comprises transitioning the aerial vehicle from the forward-flight orientation to the hover-flight orientation at a third location that is not substantially on the tether sphere.

15. A system comprising:
   a tether connected to a ground station, wherein the tether defines a tether sphere having a radius based on a length of the tether;
   an aerial vehicle connected to the tether; and
   a control system programmed to:
      operate the aerial vehicle in a crosswind-flight orientation;
      while the aerial vehicle is in the crosswind-flight orientation, position the aerial vehicle at a first location that is substantially on the tether sphere, wherein the first location is substantially downwind of the ground station;

transition the aerial vehicle from the crosswind-flight orientation to a forward-flight orientation, such that the aerial vehicle moves from the tether sphere, wherein the aerial vehicle has attached flow, and wherein a tension of the tether is reduced, and operate the aerial vehicle in the forward-flight orientation to ascend at an angle of ascent to a second location, wherein the second location is substantially downwind of the ground station.

16. The system of claim 15, wherein the aerial vehicle has attached flow during the ascent.

17. The system of claim 15, wherein operating the aerial vehicle in the forward-flight orientation to ascend at the angle of ascent to the second location comprises operating the aerial vehicle with substantially no thrust.

18. A method comprising:

operating an aerial vehicle in a crosswind-flight orientation, wherein the aerial vehicle is connected to a tether that defines a tether sphere having a radius based on a length of the tether, wherein the tether is connected to a ground station;

while the aerial vehicle is in the crosswind-flight orientation, positioning the aerial vehicle at a first location that is substantially on the tether sphere, wherein the first location is substantially downwind of the ground station;

transitioning the aerial vehicle from the crosswind-flight orientation to a forward-flight orientation, such that a tension of the tether is reduced, wherein the aerial vehicle has attached flow; and operating the aerial vehicle in the forward-flight orientation to ascend at an angle of ascent to a second location, wherein the second location is substantially downwind of the ground station.

19. The method of claim 18, wherein operating the aerial vehicle in the forward-flight orientation to ascend at an angle of ascent to the second location comprises operating the aerial vehicle substantially along a portion of the tether sphere.

* * * * *